United States Patent
Damera-Venkata et al.

(10) Patent No.: US 8,872,869 B2
(45) Date of Patent: Oct. 28, 2014

(54) SYSTEM AND METHOD FOR CORRECTING DEFECTIVE PIXELS OF A DISPLAY DEVICE

(75) Inventors: Niranjan Damera-Venkata, Mountain View, CA (US); Robert A. Ulichney, Stow, MA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3153 days.

(21) Appl. No.: 10/996,083

(22) Filed: Nov. 23, 2004

(65) Prior Publication Data

US 2006/0109286 A1    May 25, 2006

(51) Int. Cl.
    *G09G 5/02* (2006.01)
    *G09G 3/20* (2006.01)
    *H04N 5/21* (2006.01)
    *G09G 3/00* (2006.01)

(52) U.S. Cl.
    CPC .......... *G09G 3/20* (2013.01); *G09G 2310/0224* (2013.01); *H04N 5/21* (2013.01); *G09G 3/007* (2013.01); *G09G 2340/0407* (2013.01); *G09G 2330/10* (2013.01)
    USPC .......................................... 345/694; 345/629

(58) Field of Classification Search
    None
    See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,317,409 A | 5/1994 | Macocs | |
| 5,386,253 A | 1/1995 | Fielding | |
| 5,490,009 A | 2/1996 | Venkateswar et al. | |
| 5,504,504 A * | 4/1996 | Markandey et al. | .......... 345/214 |
| 5,557,353 A | 9/1996 | Stahl | |
| 5,689,283 A | 11/1997 | Shirochi | |
| 5,912,773 A | 6/1999 | Barnett et al. | |

(Continued)

FOREIGN PATENT DOCUMENTS

| | | |
|---|---|---|
| EP | 1001306 A2 | 5/2000 |
| EP | 1388839 | 2/2004 |
| EP | 1388840 | 2/2004 |
| EP | 1553548 | 7/2005 |

OTHER PUBLICATIONS

L.M. Chen and S. Hasagawa, "Visual Resolution Limits for Color Matrix Displays", "One Panel Projectors" Displays, Technologies, and Applications, vol. 13, pp. 221-226, 1992.

(Continued)

*Primary Examiner* — Seokyun Moon

(57) ABSTRACT

A method of displaying an image with a display device having at least one defective display pixel is provided. The method comprises generating first, second, and third sub-frames using image data for the image, information that identifies the at least one defective display pixel, a first pixel offset associated with the second sub-frame, and a sub-pixel offset associated with the third sub-frame, and alternating between displaying the first sub-frame in a first position, displaying the second sub-frame in a second position spatially offset from the first position according to the first pixel offset, and displaying the third sub-frame in a third position spatially offset from the first position and the second position according to the sub-pixel offset.

26 Claims, 21 Drawing Sheets

(56) References Cited

U.S. PATENT DOCUMENTS

| | | |
|---|---|---|
| 5,920,365 A | 7/1999 | Eriksson |
| 5,953,148 A | 9/1999 | Moseley et al. |
| 5,978,518 A | 11/1999 | Oliyide et al. |
| 6,025,951 A | 2/2000 | Swart et al. |
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,313,888 B1 | 11/2001 | Tabata |
| 6,384,816 B1 | 5/2002 | Tabata |
| 6,393,145 B2 | 5/2002 | Betrisey et al. |
| 6,522,356 B1 | 2/2003 | Watanabe |
| 6,657,603 B1 | 12/2003 | Demetrescu et al. |
| 2003/0020809 A1 | 1/2003 | Gibbon et al. |
| 2003/0076325 A1 | 4/2003 | Thrasher |
| 2003/0090597 A1 | 5/2003 | Katoh et al. |

OTHER PUBLICATIONS

A. Yasuda et al., "FLC Wobbling for High-Resolution Projectors", Journal of the SID 5/3 1997, pp. 299-305.

T. Tokita et al., P-108: FLC Resolution-Enhancing Device for Projection Displays, SID 02 Digest 2002, pp. 638-641.

D.K. Kelley, "Motion and Vision—II. Stabilized Spatio-Temporal Threshold Surface", Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

\* cited by examiner

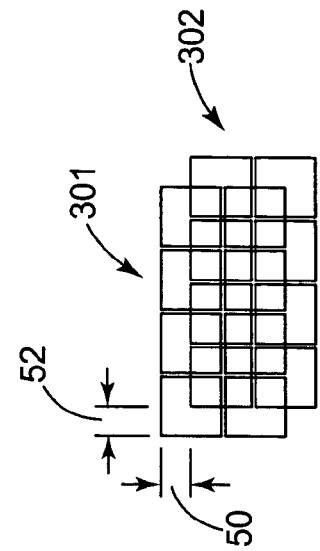
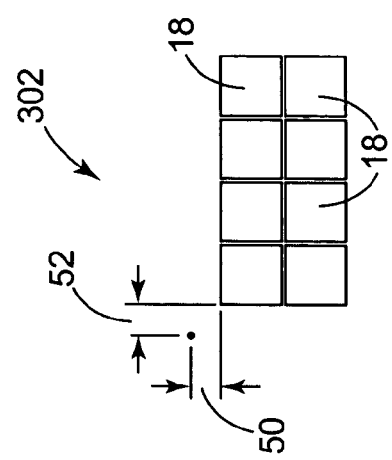
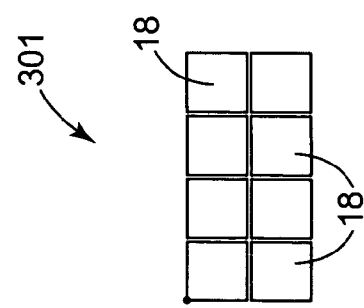
Fig. 2C
Fig. 2B
Fig. 2A

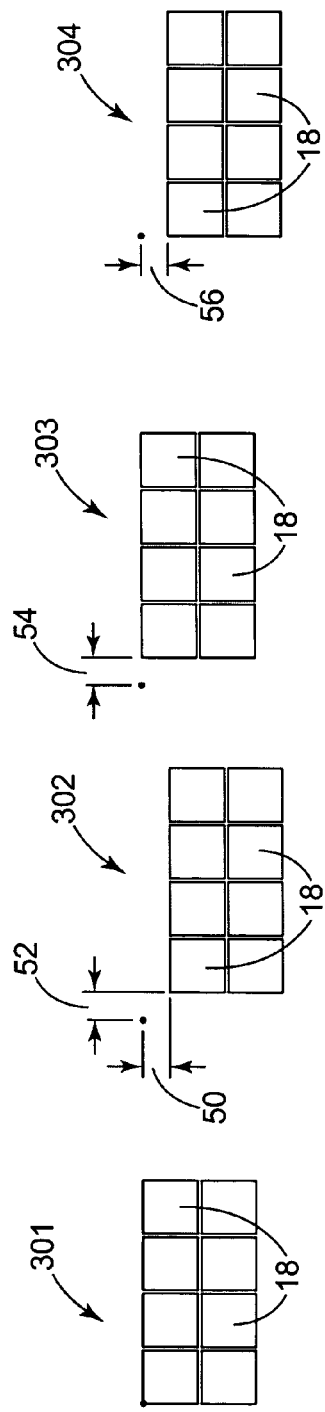
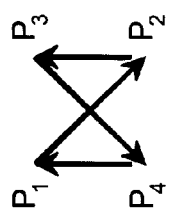
Fig. 3A  Fig. 3B  Fig. 3C  Fig. 3D  Fig. 3E (NEAREST NEIGHBOR)

(BILINEAR)

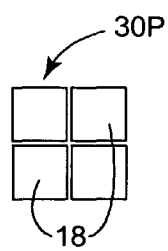
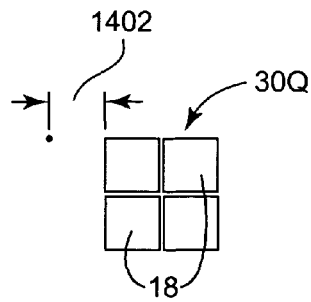
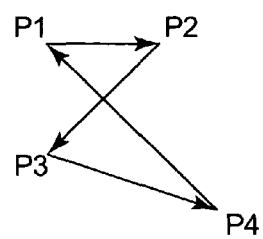
Fig. 20A    Fig. 20B
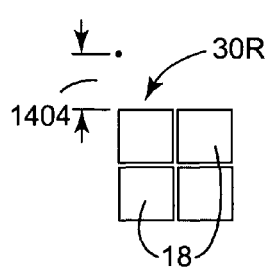
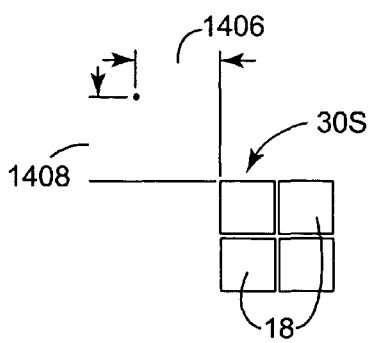
Fig. 20E
Fig. 20C    Fig. 20D
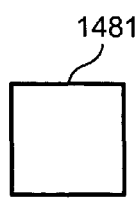
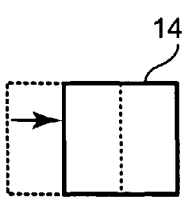
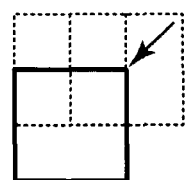
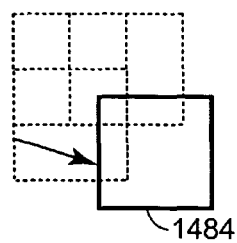
Fig. 21A  Fig. 21B  Fig. 21C  Fig. 21D

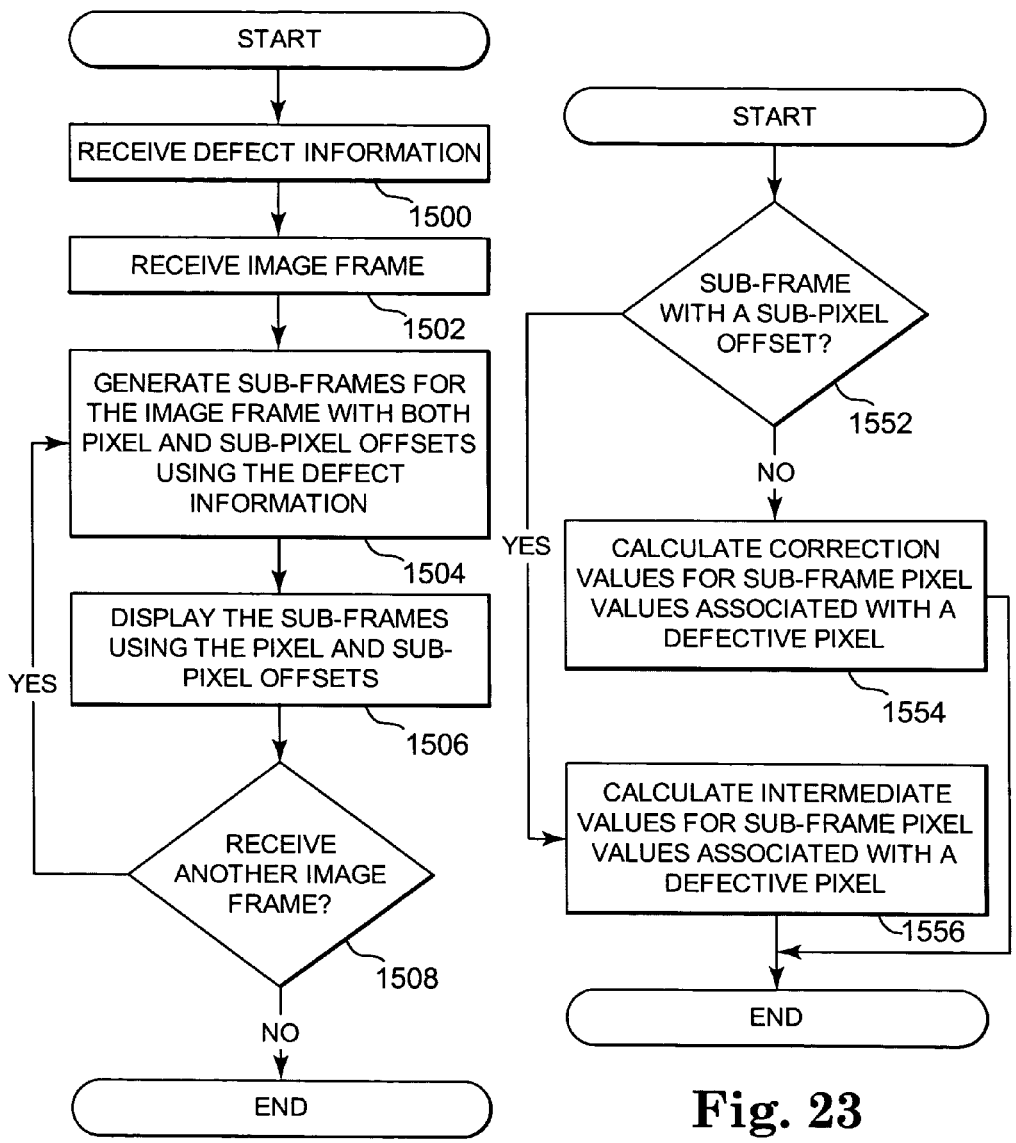

SYSTEM AND METHOD FOR CORRECTING DEFECTIVE PIXELS OF A DISPLAY DEVICE

CROSS-REFERENCE TO RELATED APPLICATIONS

This application is related to U.S. patent application Ser. No. 10/213,555, filed on Aug. 7, 2002, entitled IMAGE DISPLAY SYSTEM Sep. 11, 2002, entitled IMAGE DISPLAY SYSTEM AND METHOD; AND METHOD; U.S. patent application Ser. No. 10/242,195, filed on U.S. patent application Ser. No. 10/242,545, filed on Sep. 11, 2002, entitled IMAGE DISPLAY SYSTEM AND METHOD; U.S. patent application Ser. No. 10/631,681, filed Jul. 31, 2003, entitled GENERATING AND DISPLAYING SPATIALLY OFFSET SUB-FRAMES; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES; U.S. patent application Ser. No. 10/672,544, filed Sep. 26, 2003, entitled GENERATING AND DISPLAYING SPATIALLY OFFSET SUB-FRAMES; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30, 2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; U.S. patent application Ser. No. 10/820,952, filed Apr. 8, 2004, entitled GENERATING AND DISPLAYING SPATIALLY OFFSET SUB-FRAMES; U.S. patent application Ser. No. 10/864,125, Docket No. 200401412-1, filed Jun. 9, 2004, entitled GENERATING AND DISPLAYING SPATIALLY OFFSET SUB-FRAMES; U.S. patent application Ser. No. 10/868,719, filed Jun. 15, 2004, entitled GENERATING AND DISPLAYING SPATIALLY OFFSET SUB-FRAMES, and U.S. patent application Ser. No. 10/868,638, filed Jun. 15, 2004, entitled GENERATING AND DISPLAYING SPATIALLY OFFSET SUB-FRAMES. Each of the above U.S. patent applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image must be increased. Increasing a resolution of the display device, however, increases a cost and complexity of the display device. In addition, higher resolution image data may not be available and/or may be difficult to generate.

SUMMARY

One form of the present invention provides a method of displaying an image with a display device having at least one defective display pixel. The method comprises generating first, second, and third sub-frames using image data for the image, information that identifies the at least one defective display pixel, a first pixel offset associated with the second sub-frame, and a sub-pixel offset associated with the third sub-frame, and alternating between displaying the first sub-frame in a first position, displaying the second sub-frame in a second position spatially offset from the first position according to the first pixel offset, and displaying the third sub-frame in a third position spatially offset from the first position and the second position according to the sub-pixel offset.

BRIEF DESCRIPTION OF THE DRAWINGS

FIGS. 2A-2C are schematic diagrams illustrating the display of two sub-frames according to one embodiment of the present invention.

FIGS. 3A-3E are schematic diagrams illustrating the display of four sub-frames according to one embodiment of the present invention.

FIGS. 20A-20E are schematic diagrams illustrating the display of four sub-frames with pixel and sub-pixel offsets according to one embodiment of the present invention.

FIGS. 21A-21D are schematic diagrams illustrating the display of a pixel with an image display system with pixel and sub-pixel offsets according to one embodiment of the present invention.

FIG. 22 is a flow chart illustrating a method for generating and displaying sub-frames with pixel and sub-pixel offsets according to one embodiment of the present invention.

FIG. 23 is a flow chart illustrating a method for generating sub-frame pixel values associated with defective pixels according to one embodiment of the present invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-Frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. A problem of sub-frame generation, which is addressed by embodiments of the present invention, is to determine appropriate values for the sub-frames so that the displayed sub-frames are close in appearance to how the high-resolution image from which the sub-frames were derived would appear if directly displayed.

One embodiment of a display system that provides the appearance of enhanced resolution through temporal and spatial shifting of sub-frames is described in the above-cited U.S. patent applications, and is summarized below with reference to FIGS. 1-4E.

Figure 1:
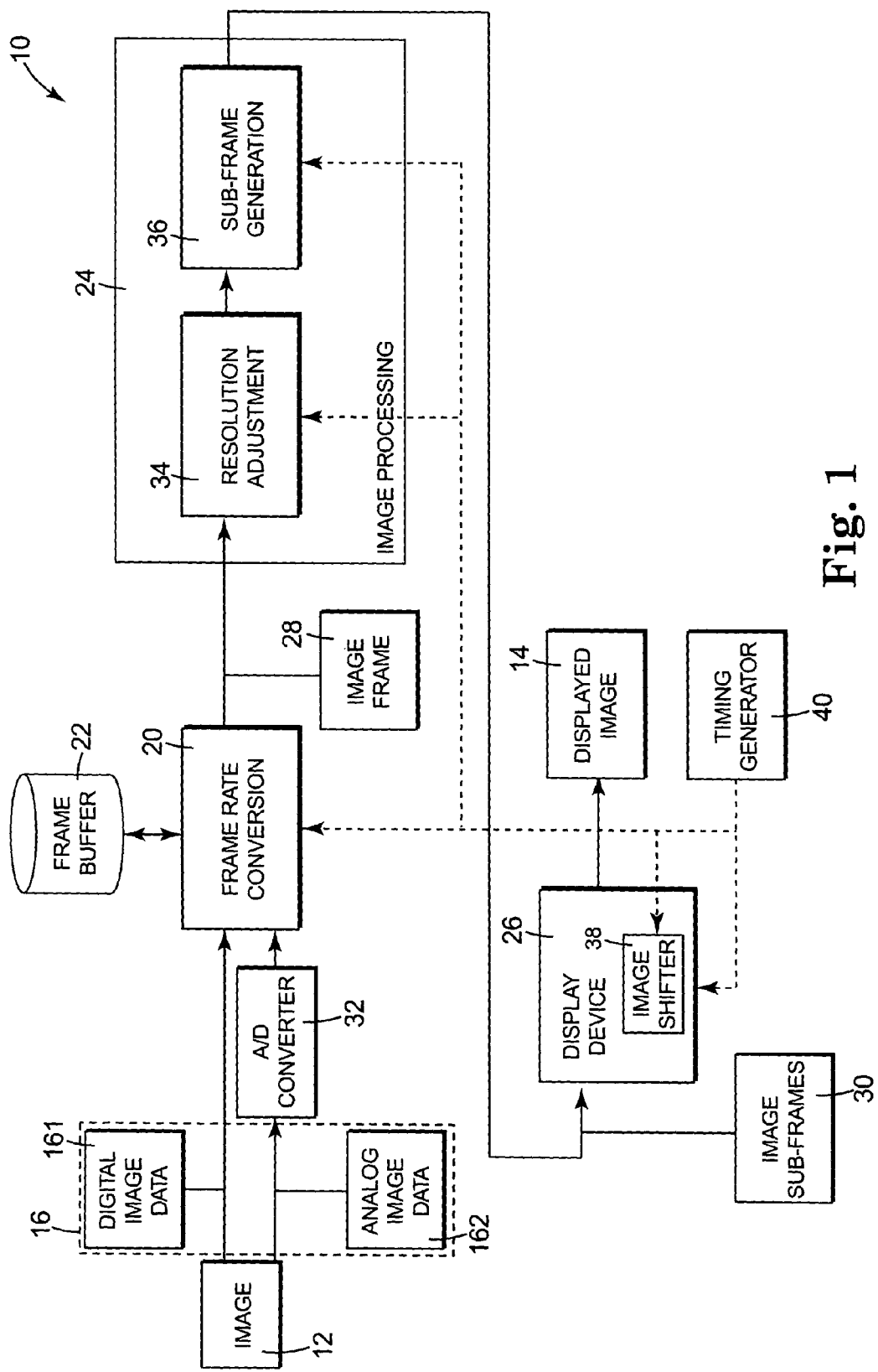
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

In one embodiment, as illustrated in FIGS. 2A and 2B, image processing unit 24 defines two image sub-frames 30 for image frame 28. More specifically, image processing unit 24 defines a first sub-frame 30₁ and a second sub-frame 30₂ for image frame 28. As such, first sub-frame 30₁ and second sub-frame 30₂ each include a plurality of columns and a plurality of rows of individual pixels 18 of image data 16. Thus, first sub-frame 30₁ and second sub-frame 30₂ each constitute an image data array or pixel matrix of a subset of image data 16.

In one embodiment, as illustrated in FIG. 2B, second sub-frame 30₂ is offset from first sub-frame 30₁ by a vertical distance 50 and a horizontal distance 52. As such, second sub-frame 30₂ is spatially offset from first sub-frame 30₁ by a predetermined distance. In one illustrative embodiment, vertical distance 50 and horizontal distance 52 are each approximately one-half of one pixel.

As illustrated in FIG. 2C, display device 26 alternates between displaying first sub-frame 30₁ in a first position and displaying second sub-frame 30₂ in a second position spatially offset from the first position. More specifically, display device 26 shifts display of second sub-frame 30₂ relative to display of first sub-frame 30₁ by vertical distance 50 and horizontal distance 52. As such, pixels of first sub-frame 30₁ overlap pixels of second sub-frame 30₂. In one embodiment, display device 26 performs one cycle of displaying first sub-frame 30₁ in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
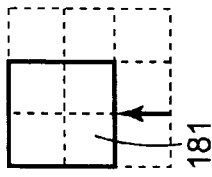
FIGS. 4A-4E are schematic diagrams illustrating the display of a pixel with an image display system according to one embodiment of the present invention.
Figure 4D:
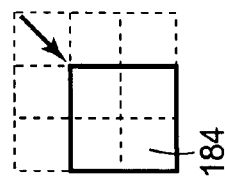
Figure 4C:
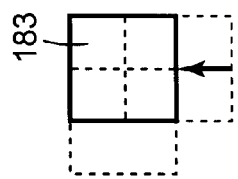
Figure 4B:
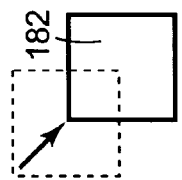
Figure 4A:
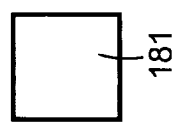

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. In one embodiment, sub-frame generation unit 36 is configured to generate sub-frames 30 based on one of five algorithms. These five algorithms are referred to herein as the following: (1) nearest neighbor; (2) bilinear; (3) spatial domain; (4) frequency domain; and (5) adaptive multi-pass.

The nearest neighbor algorithm and the bilinear algorithm according to one form of the invention generate sub-frames 30 by combining pixels from a high resolution image 28. The spatial domain algorithm and the frequency domain algorithm according to one form of the invention generate sub-frames 30 based on the minimization of a global error metric that represents a difference between a simulated high resolution image and a desired high resolution image 28. The adaptive multi-pass algorithm according to one form of the invention generates sub-frames 30 based on the minimization of a local error metric. In one embodiment, sub-frame generation unit 36 includes memory for storing a relationship between sub-frame values and high resolution image values, wherein the relationship is based on minimization of an error metric between the high resolution image values and a simulated high resolution image that is a function of the sub-frame values. Embodiments of each of these five algorithms are described below with reference to FIGS. 5-18.

II. Nearest Neighbor

Figure 5:
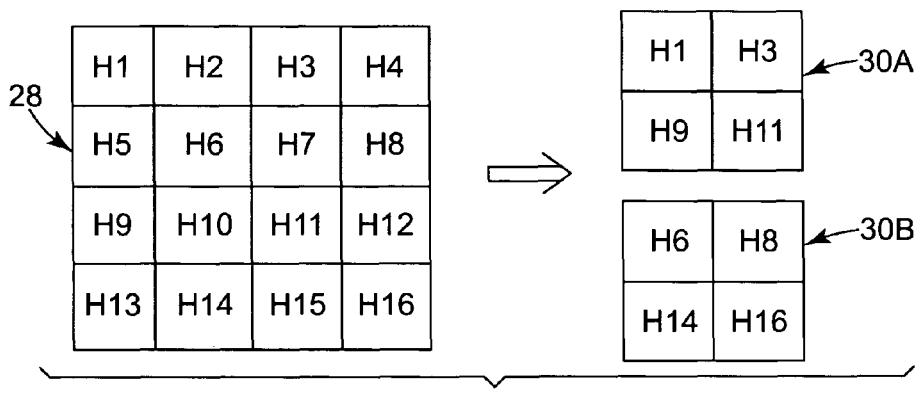
FIG. 5 is a diagram illustrating the generation of low resolution sub-frames from an original high resolution image using a nearest neighbor algorithm according to one embodiment of the present invention.

FIG. 5 is a diagram illustrating the generation of low resolution sub-frames 30A and 30B (collectively referred to as sub-frames 30) from an original high resolution image 28 using a nearest neighbor algorithm according to one embodiment of the present invention. In the illustrated embodiment, high resolution image 28 includes four columns and four rows of pixels, for a total of sixteen pixels H1-H16. In one embodiment of the nearest neighbor algorithm, a first sub-frame 30A is generated by taking every other pixel in a first row of the high resolution image 28, skipping the second row of the high resolution image 28, taking every other pixel in the third row of the high resolution image 28, and repeating this process throughout the high resolution image 28. Thus, as shown in FIG. 5, the first row of sub-frame 30A includes pixels H1 and H3, and the second row of sub-frame 30A includes pixels H9 and H11. In one form of the invention, a second sub-frame 30B is generated in the same manner as the first sub-frame 30A, but the process begins at a pixel H6 that is shifted down one row and over one column from the first pixel H1. Thus, as shown in FIG. 5, the first row of sub-frame 30B includes pixels H6 and H8, and the second row of sub-frame 30B includes pixels H14 and H16.

In one embodiment, the nearest neighbor algorithm is implemented with a 2×2 filter with three filter coefficients of "0" and a fourth filter coefficient of "1" to generate a weighted sum of the pixel values from the high resolution image. Displaying sub-frames 30A and 30B using two-position processing as described above gives the appearance of a higher resolution image. The nearest neighbor algorithm is also applicable to four-position processing, and is not limited to images having the number of pixels shown in FIG. 5.

III. Bilinear

Figure 6:
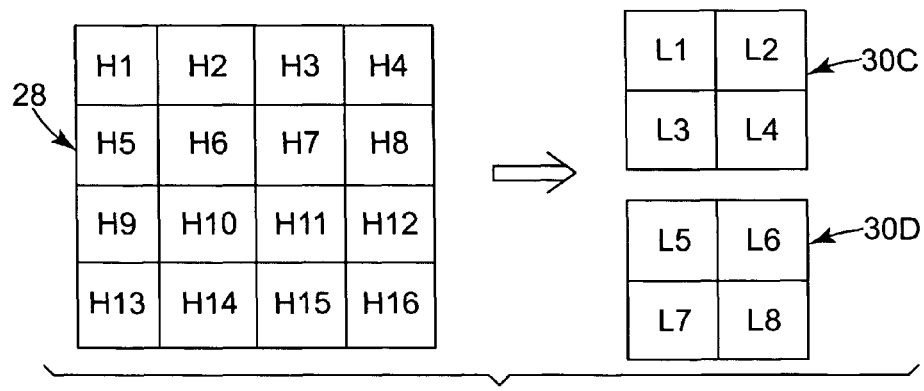
FIG. 6 is a diagram illustrating the generation of low resolution sub-frames from an original high resolution image using a bilinear algorithm according to one embodiment of the present invention.

FIG. 6 is a diagram illustrating the generation of low resolution sub-frames 30C and 30D (collectively referred to as sub-frames 30) from an original high resolution image 28 using a bilinear algorithm according to one embodiment of the present invention. In the illustrated embodiment, high resolution image 28 includes four columns and four rows of pixels, for a total of sixteen pixels H1-H16. Sub-frame 30C includes two columns and two rows of pixels, for a total of four pixels L1-L4. And sub-frame 30D includes two columns and two rows of pixels, for a total of four pixels L5-L8.

In one embodiment, the values for pixels L1-L8 in sub-frames 30C and 30D are generated from the pixel values H1-H16 of image 28 based on the following Equations I-VIII:

$$L1=(4H1+2H2+2H5)/8 \quad \text{Equation I}$$

$$L2=(4H3+2H4+2H7)/8 \quad \text{Equation II}$$

$$L3=(4H9+2H10+2H13)/8 \quad \text{Equation III}$$

$$L4=(4H11+2H12+2H15)/8 \quad \text{Equation IV}$$

$$L5=(4H6+2H2+2H5)/8 \quad \text{Equation V}$$

$$L6=(4H8+2H4+2H7)/8 \quad \text{Equation VI}$$

$$L7=(4H14+2H10+2H13)/8 \quad \text{Equation VII}$$

$$L8=(4H16+2H12+2H15)/8 \quad \text{Equation VIII}$$

As can be seen from the above Equations I-VIII, the values of the pixels L1-L4 in sub-frame 30C are influenced the most by the values of pixels H1, H3, H9, and H11, respectively, due to the multiplication by four. But the values for the pixels L1-L4 in sub-frame 30C are also influenced by the values of diagonal neighbors of pixels H1, H3, H9, and H11. Similarly, the values of the pixels L5-L8 in sub-frame 30D are influenced the most by the values of pixels H6, H8, H14, and H16, respectively, due to the multiplication by four. But the values for the pixels L5-L8 in sub-frame 30D are also influenced by the values of diagonal neighbors of pixels H6, H8, H14, and H16.

In one embodiment, the bilinear algorithm is implemented with a 2×2 filter with one filter coefficient of "0" and three filter coefficients having a non-zero value (e.g., 4, 2, and 2) to generate a weighted sum of the pixel values from the high resolution image. In another embodiment, other values are used for the filter coefficients. Displaying sub-frames 30C and 30D using two-position processing as described above gives the appearance of a higher resolution image. The bilinear algorithm is also applicable to four-position processing, and is not limited to images having the number of pixels shown in FIG. 6.

In one form of the nearest neighbor and bilinear algorithms, sub-frames 30 are generated based on a linear combination of pixel values from an original high resolution image as described above. In another embodiment, sub-frames 30 are generated based on a non-linear combination of pixel values from an original high resolution image. For example, if the original high resolution image is gamma-corrected, appropriate non-linear combinations are used in one embodiment to undo the effect of the gamma curve.

IV. Systems for Generating Simulated High Resolution Images

FIGS. 7-10 illustrate systems for generating simulated high resolution images. Based on these systems, spatial domain, frequency domain, and adaptive multi-pass algorithms for generating sub-frames are developed, as described in further detail below.

Figure 7:
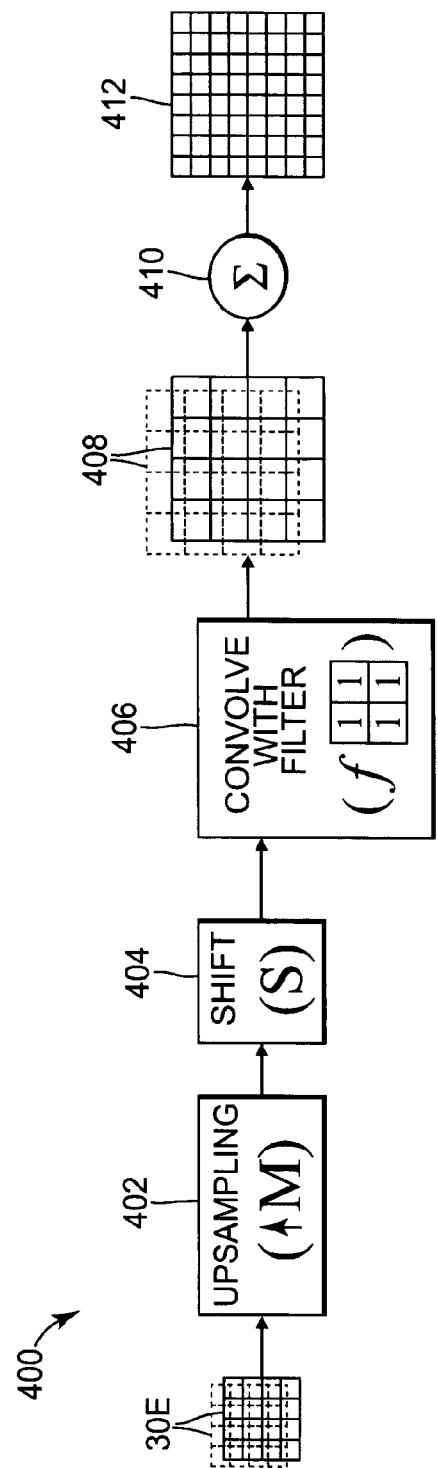
FIG. 7 is a block diagram illustrating a system for generating a simulated high resolution image according to one embodiment of the present invention.

FIG. 7 is a block diagram illustrating a system 400 for generating a simulated high resolution image 412 from two 4×4 pixel low resolution sub-frames 30E according to one embodiment of the present invention. System 400 includes upsampling stage 402, shifting stage 404, convolution stage 406, and summation stage 410. Sub-frames 30E are upsampled by upsampling stage 402 based on a sampling matrix, M, thereby generating upsampled images. The upsampled images are shifted by shifting stage 404 based on a spatial shifting matrix, S, thereby generating shifted upsampled images. The shifted upsampled images are convolved with an interpolating filter at convolution stage 406, thereby generating blocked images 408. In the illustrated embodiment, the interpolating filter is a 2×2 filter with filter coefficients of "1", and with the center of the convolution being the upper left position in the 2×2 matrix. The interpolating filter simulates the superposition of low resolution sub-frames on a high resolution grid. The low resolution sub-frame pixel data is expanded so that the sub-frames can be represented on a high resolution grid. The interpolating filter fills in the missing pixel data produced by upsampling. The blocked images 408 are weighted and summed by summation block 410 to generate the 8×8 pixel simulated high resolution image 412.

Figure 8:
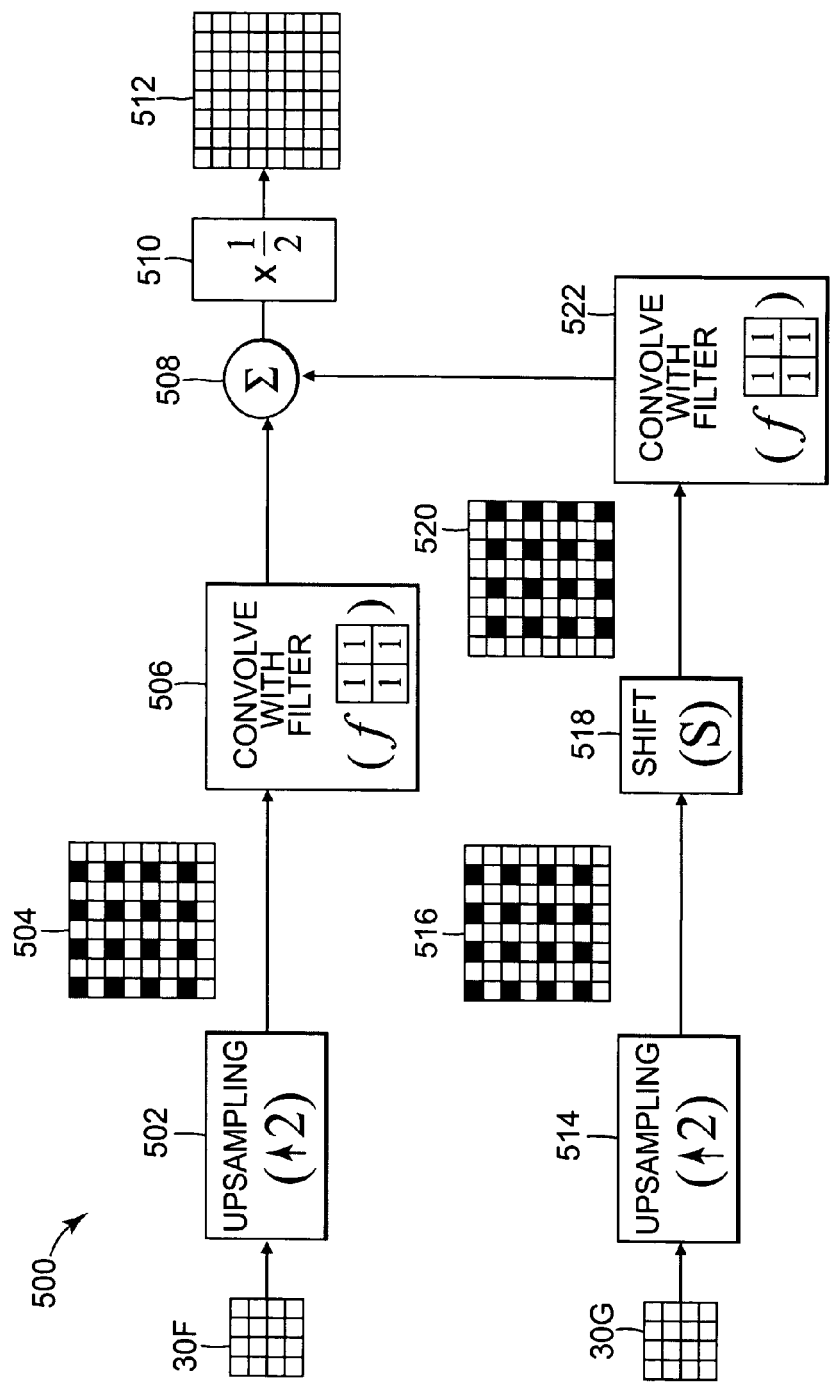
FIG. 8 is a block diagram illustrating a system for generating a simulated high resolution image for two-position processing based on separable upsampling according to one embodiment of the present invention.

FIG. 8 is a block diagram illustrating a system 500 for generating a simulated high resolution image 512 for two-position processing based on separable upsampling of two 4×4 pixel low resolution sub-frames 30F and 30G according to one embodiment of the present invention. System 500 includes upsampling stages 502 and 514, shifting stage 518, convolution stages 506 and 522, summation stage 508, and multiplication stage 510. Sub-frame 30F is upsampled by a factor of two by upsampling stage 502, thereby generating an 8×8 pixel upsampled image 504. The dark pixels in upsampled image 504 represent the sixteen pixels from sub-frame 30F, and the light pixels in upsampled image 504 represent zero values. Sub-frame 30G is upsampled by a factor of two by upsampling stage 514, thereby generating an 8×8 pixel upsampled image 516. The dark pixels in upsampled image 516 represent the sixteen pixels from sub-frame 30G, and the light pixels in upsampled image 516 represent zero values. In one embodiment, upsampling stages 502 and 514 upsample sub-frames 30F and 30G, respectively, using a diagonal sampling matrix.

The upsampled image 516 is shifted by shifting stage 518 based on a spatial shifting matrix, S, thereby generating shifted upsampled image 520. In the illustrated embodiment, shifting stage 518 performs a one pixel diagonal shift. Images 504 and 520 are convolved with an interpolating filter at convolution stages 506 and 522, respectively, thereby generating blocked images. In the illustrated embodiment, the interpolating filter at convolution stages 506 and 522 is a 2×2 filter with filter coefficients of "1", and with the center of the convolution being the upper left position in the 2×2 matrix.

The blocked images generated at convolution stages 506 and 522 are summed by summation block 508, and multiplied by a factor of 0.5 at multiplication stage 510, to generate the 8×8 pixel simulated high resolution image 512. The image data is multiplied by a factor of 0.5 at multiplication stage 510 because, in one embodiment, each of the sub-frames 30F and 30G is displayed for only half of the time slot per period allotted to a color. In another embodiment, rather than multiplying by a factor of 0.5 at multiplication stage 510, the filter coefficients of the interpolating filter at stages 506 and 522 are reduced by a factor of 0.5.

In one embodiment, as shown in FIG. 8 and described above, the low resolution sub-frame data is represented by two separate sub-frames 30F and 30G, which are separately upsampled based on a diagonal sampling matrix (i.e., separable upsampling). In another embodiment, as described below with reference to FIG. 9, the low resolution sub-frame data is represented by a single sub-frame, which is upsampled based on a non-diagonal sampling matrix (i.e., non-separable upsampling).

Figure 9:
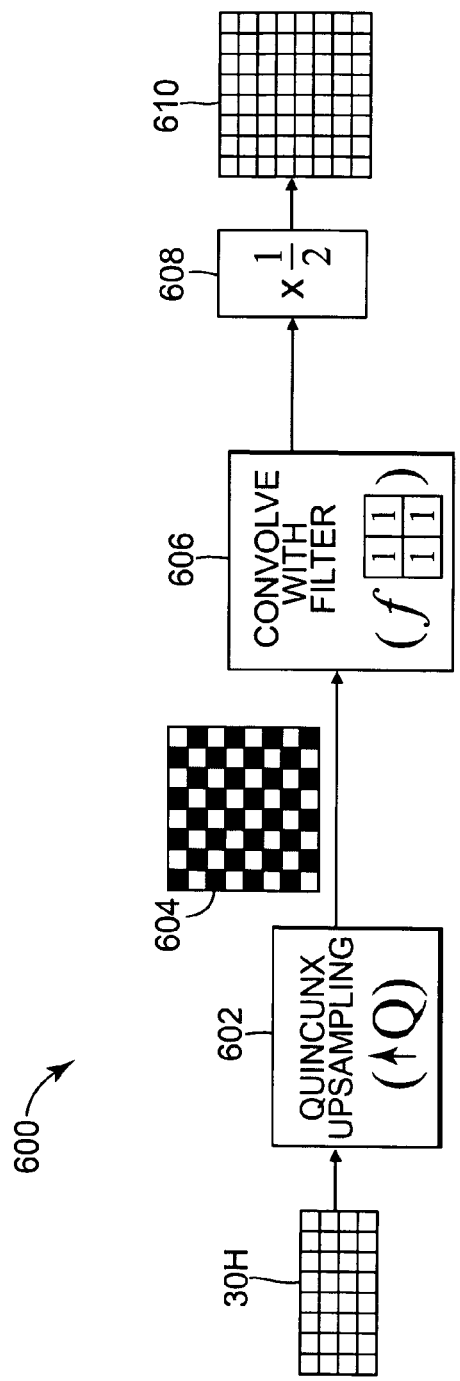
FIG. 9 is a block diagram illustrating a system for generating a simulated high resolution image for two-position processing based on non-separable upsampling according to one embodiment of the present invention.

FIG. 9 is a block diagram illustrating a system 600 for generating a simulated high resolution image 610 for two-position processing based on non-separable upsampling of an 8×4 pixel low resolution sub-frame 30H according to one embodiment of the present invention. System 600 includes quincunx upsampling stage 602, convolution stage 606, and multiplication stage 608. Sub-frame 30H is upsampled by quincunx upsampling stage 602 based on a quincunx sampling matrix, Q, thereby generating upsampled image 604. The dark pixels in upsampled image 604 represent the thirty-two pixels from sub-frame 30H, and the light pixels in upsampled image 604 represent zero values. Sub-frame 30H includes pixel data for two 4×4 pixel sub-frames for two-position processing. The dark pixels in the first, third, fifth, and seventh rows of upsampled image 604 represent pixels for a first 4×4 pixel sub-frame, and the dark pixels in the second, fourth, sixth, and eighth rows of upsampled image 604 represent pixels for a second 4×4 pixel sub-frame.

The upsampled image 604 is convolved with an interpolating filter at convolution stage 606, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 606 is multiplied by a factor of 0.5 at multiplication stage 608, to generate the 8×8 pixel simulated high resolution image 610.

Figure 10:
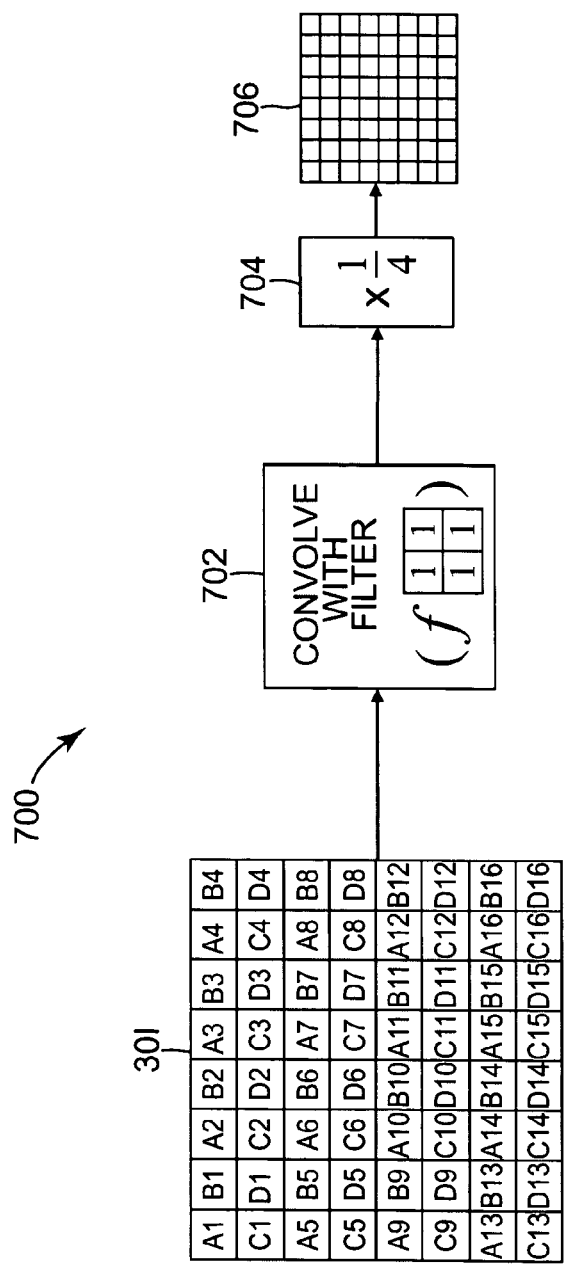
FIG. 10 is a block diagram illustrating a system for generating a simulated high resolution image for four-position processing according to one embodiment of the present invention.

FIG. 10 is a block diagram illustrating a system 700 for generating a simulated high resolution image 706 for four-position processing based on sub-frame 301 according to one embodiment of the present invention. In the embodiment illustrated in FIG. 10, sub-frame 301 is an 8×8 array of pixels. Sub-frame 301 includes pixel data for four 4×4 pixel sub-frames for four-position processing. Pixels A1-A16 represent pixels for a first 4×4 pixel sub-frame, pixels B1-B16 represent pixels for a second 4×4 pixel sub-frame, pixels C1-C16 represent pixels for a third 4×4 pixel sub-frame, and pixels D1-D16 represent pixels for a fourth 4×4 pixel sub-frame.

The sub-frame 301 is convolved with an interpolating filter at convolution stage 702, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 702 is multiplied by a factor of 0.25 at multiplication stage 704, to generate the 8×8 pixel simulated high resolution image 706. The image data is multiplied by a factor of 0.25 at multiplication stage 704 because, in one embodiment, each of the four sub-frames represented by sub-frame 301 is displayed for only one fourth of the time slot per period allotted to a color. In another embodiment, rather than multiplying by a factor of 0.25 at multiplication stage 704, the filter coefficients of the interpolating filter are correspondingly reduced.

V. Generation of Sub-Frames Based on Error Minimization

As described above, systems 400, 500, 600, and 700 generate simulated high resolution images 412, 512, 610, and 706, respectively, based on low resolution sub-frames. If the sub-frames are optimal, the simulated high resolution image will be as close as possible to the original high resolution image 28. Various error metrics may be used to determine how close a simulated high resolution image is to an original high resolution image, including mean square error, weighted mean square error, as well as others.

Figure 11:
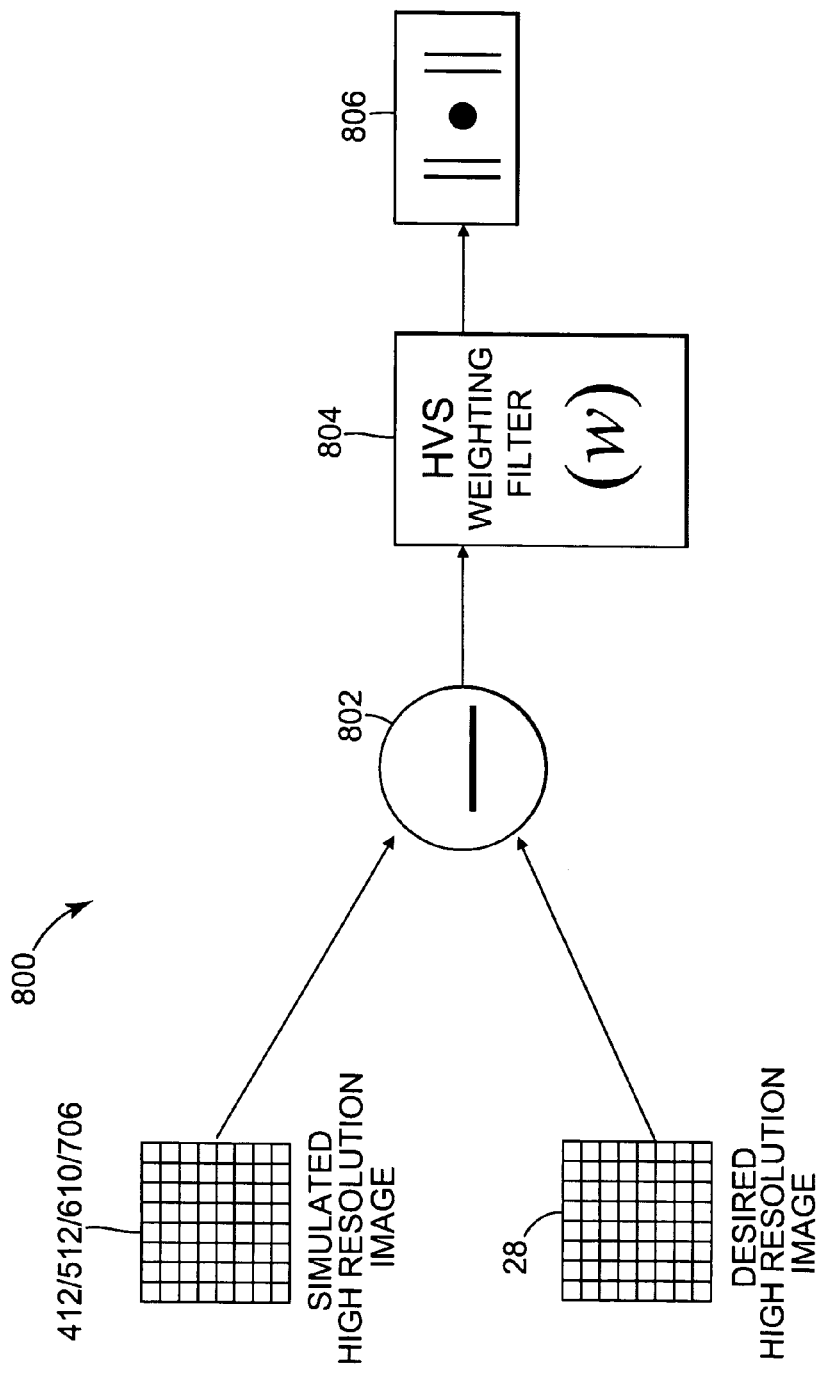
FIG. 11 is a block diagram illustrating the comparison of a simulated high resolution image and a desired high resolution image according to one embodiment of the present invention.

FIG. 11 is a block diagram illustrating the comparison of a simulated high resolution image 412/512/610/706 and a desired high resolution image 28 according to one embodiment of the present invention. A simulated high resolution image 412, 512, 610, or 706, is subtracted on a pixel-by-pixel basis from high resolution image 28 at subtraction stage 802. In one embodiment, the resulting error image data is filtered by a human visual system (HVS) weighting filter (W) 804. In one form of the invention, HVS weighting filter 804 filters the error image data based on characteristics of the human visual system. In one embodiment, HVS weighting filter 804 reduces or eliminates high frequency errors. The mean squared error of the filtered data is then determined at stage 806 to provide a measure of how close the simulated high resolution image 412, 512, 610, or 706 is to the desired high resolution image 28.

In one embodiment, systems 400, 500, 600, and 700 are represented mathematically in an error cost equation that measures the difference between a simulated high resolution image 412, 512, 610, or 706, and the original high resolution image 28. Optimal sub-frames are identified by solving the error cost equation for the sub-frame data that provides the minimum error between the simulated high resolution image and the desired high resolution image. In one embodiment, globally optimum solutions are obtained in the spatial domain and in the frequency domain, and a locally optimum solution is obtained using an adaptive multi-pass algorithm. The spatial domain, frequency domain, and adaptive multi-pass algorithms are described in further detail below with reference to FIGS. 12-18.

VI. Spatial Domain

A spatial domain solution for generating optimal sub-frames according to one embodiment is described in the context of the system 600 shown in FIG. 9. The system 600 shown in FIG. 9 can be represented mathematically in an error cost function by the following Equation IX:

$$l_Q^* = \operatorname*{argmin}_{l_Q} J = \operatorname*{argmin}_{l_Q} \sum_n \left( \sum_k l_Q(k) f(n-k) - h(n) \right)^2 \quad \text{Equation IX}$$

where:
 $l^*_Q$=optimal low resolution data for sub-frame 30H;
 J=error cost function to be minimized;
 n and k=indices for identifying high resolution pixel locations for images 604 and 610;
 $l_Q(k)$=image data from upsampled image 604 at location k;

f(n−k)=filter coefficient of the interpolating filter at a position n−k; and h(n)=image data for desired high resolution image 28 at location n.

The summation of "$l_Q(k)f(n-k)$" in Equation IX represents the convolution of the upsampled image 604 and the interpolating filter, f, performed at stage 606 in system 600. The filter operation is performed by essentially sliding the lower right pixel of the 2×2 interpolating filter over each pixel of the upsampled image 604. The four pixels of the upsampled image 604 within the 2×2 interpolating filter window are multiplied by the corresponding filter coefficient (i.e., "1" in the illustrated embodiment). The results of the four multiplications are summed, and the value for the pixel of the upsampled image 604 corresponding to the lower right position of the interpolating filter is replaced by the sum of the four multiplication results. The high resolution data, h(n), from the high resolution image 28 is subtracted from the convolution value, $l_Q(k)f(n-k)$, to provide an error value. The summation of the squared error over all of the high resolution pixel locations provides a measure of the error to be minimized.

An optimal spatial domain solution can be obtained by taking the derivative of Equation IX with respect to each of the low resolution pixels, and setting it equal to zero as shown in the following Equation X:

$$\frac{\partial J}{\partial l_Q^*(t)} = 0, t \in \Theta \quad \text{Equation X}$$

where:

$\Theta$=the set of quincunx lattice points.

Thus, as can be seen from Equation X, the derivative is taken only at the set of quincunx lattice points, which correspond to the dark pixels in upsampled image 604 in FIG. 9. Inserting the equation for J given in Equation IX into Equation X, and taking the derivative as specified in Equation X, results in the following Equation XI:

$$\sum_k l_Q^*(k) C_{ff}(t-k) = \sum_n h(n) f(n-t), t \in \Theta \quad \text{Equation XI}$$

The symbol, $C_{ff}$, in Equation XI represents the auto-correlation coefficients of the interpolating filter, f, as defined by the following Equation XII:

$$C_{ff}(n) = \sum_k f(n)f(n+k) \quad \text{Equation XII}$$

Equation XI can be put into vector from as shown in the following Equation XIII:

$$C_{ff} l^*_Q = h_f, t \in \Theta \quad \text{Equation XIII}$$

where:

$C_{ff}$=matrix of auto-correlation coefficients of the interpolating filter, f.

$l^*_Q$=vector representing the unknown image data for sub-frame 30H, as well as "don't care" data (i.e., the image data corresponding to the light pixels in upsampled image 604);

$h_f$=vector representing a filtered version of the simulated high resolution image 610 using the interpolating filter, f.

Deleting the rows and columns corresponding to "don't care" data (i.e., the data that is not in the set of qunincunx lattice points, $\Theta$), results in the following Equation XIV:

$$\check{C}_{ff} \tilde{l}_Q^* = \tilde{h}_f \quad \text{Equation XIV}$$

where:

$\tilde{l}_Q^*$=vector representing only the unknown image data for sub-frame 30H.

The above Equation XIV is a sparse non-Toeplitz system representing a sparse system of linear equations. Since the matrix of auto-correlation coefficients is known, and the vector representing the filtered version of the simulated high resolution image 610 is known, Equation XIV can be solved to determine the optimal image data for sub-frame 30H. In one embodiment, sub-frame generation unit 36 is configured to solve Equation XIV to generate sub-frames 30.

VII. Frequency Domain

A frequency domain solution for generating optimal sub-frames 30 according to one embodiment is described in the context of the system 500 shown in FIG. 8. Before describing the frequency domain solution, a few properties of the fast fourier transform (FFT) that are applicable to the frequency domain solution are described with reference to FIGS. 12 and 13.

Figure 12:
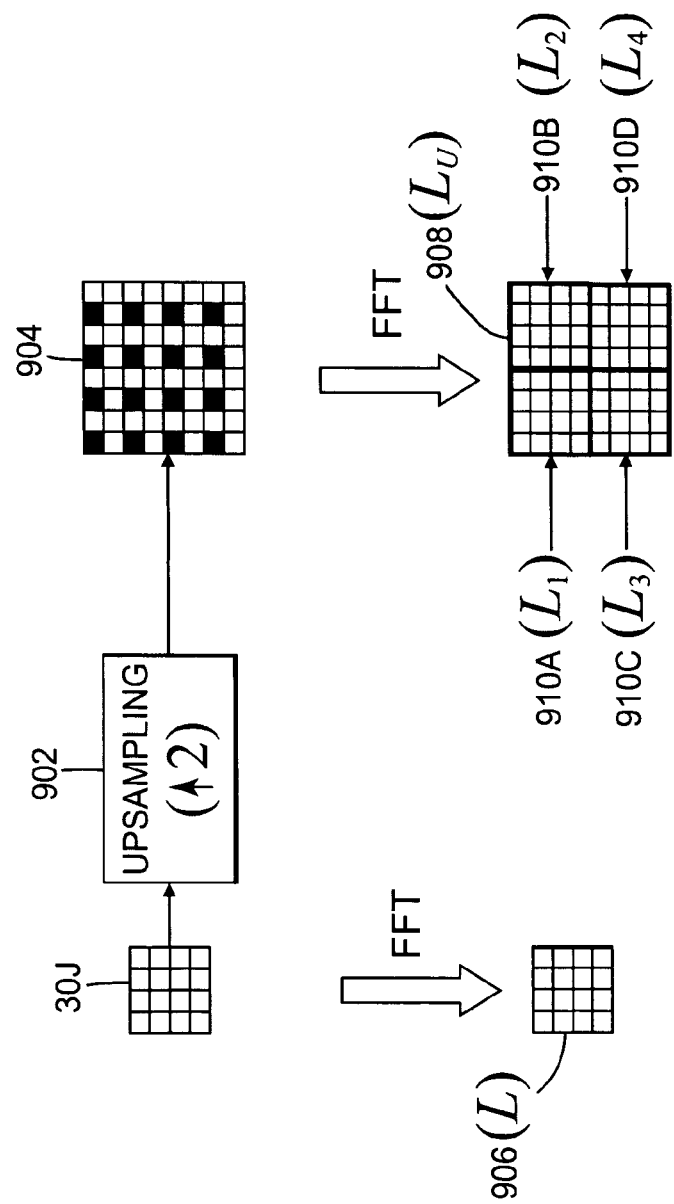
FIG. 12 is a diagram illustrating the effect in the frequency domain of the upsampling of a sub-frame according to one embodiment of the present invention.

FIG. 12 is a diagram illustrating the effect in the frequency domain of the upsampling of a 4×4 pixel sub-frame 30J according to one embodiment of the present invention. As shown in FIG. 12, sub-frame 30J is upsampled by a factor of two by upsampling stage 902 to generate an 8×8 pixel upsampled image 904. The dark pixels in upsampled image 904 represent the sixteen pixels from sub-frame 30J, and the light pixels in upsampled image 904 represent zero values. Taking the FFT of sub-frame 30J results in image (L) 906. Taking the FFT of upsampled image 904 results in image ($L_U$) 908. Image ($L_U$) 908 includes four 4×4 pixel portions, which are image portion ($L_1$) 910A, image portion ($L_2$) 910B, image portion ($L_3$) 910C, and image portion ($L_4$) 910D. As shown in FIG. 12, image portions 910A-910D are each the same as image 906 (i.e., $L_1=L_2=L_3=L_4=L$).

Figure 13:
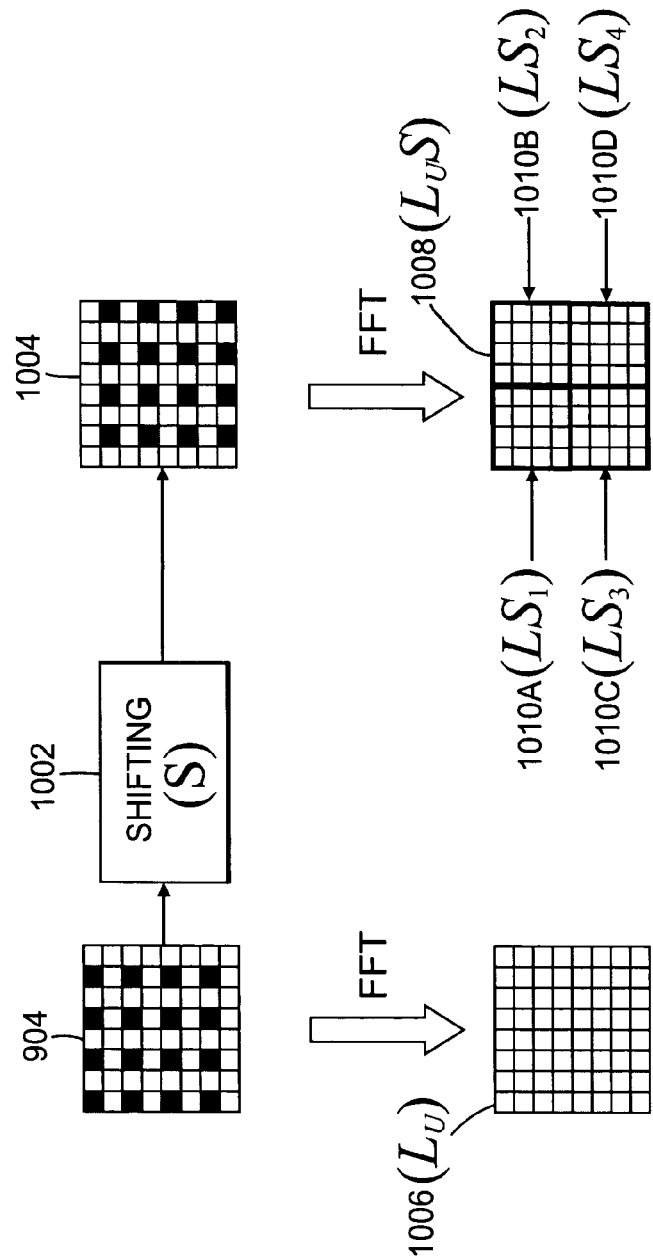
FIG. 13 is a diagram illustrating the effect in the frequency domain of the shifting of an upsampled sub-frame according to one embodiment of the present invention.

FIG. 13 is a diagram illustrating the effect in the frequency domain of the shifting of an 8×8 pixel upsampled sub-frame 904 according to one embodiment of the present invention. As shown in FIG. 13, upsampled sub-frame 904 is shifted by shifting stage 1002 to generate shifted image 1004. Taking the FFT of upsampled sub-frame 904 results in image ($L_U$) 1006. Taking the FFT of shifted image 1004 results in image ($L_US$) 1008. Image ($L_US$) 1008 includes four 4×4 pixel portions, which are image portion ($LS_1$) 1010A, image portion ($LS_2$) 1010B, image portion ($LS_3$) 1010C, and image portion ($LS_4$) 1010D. As shown in FIG. 13, image 1008 is the same as image 1006 multiplied by a complex exponential, W, (i.e., $L_US=W \cdot L_U$), where "·" denotes pointwise multiplication. The values for the complex exponential, W, are given by the following Equation XV:

$$[W]_{(k_1, k_2)} = e^{-\frac{j2\pi(k_1, k_2)}{MN}} \quad \text{Equation XV}$$

where:

$k_1$=row coordinate in the FFT domain;

$k_2$=column coordinate in the FFT domain;

M=number of columns in the image; and

N=number of rows in the image.

The system 500 shown in FIG. 8 can be represented mathematically in an error cost function by the following Equation XVI:

$$(L_A^*, L_B^*) = \underset{(L_A, L_B)}{\operatorname{argmin}} J = \underset{(L_A, L_B)}{\operatorname{argmin}} \sum_i \left[\hat{F}_i(L_A + \hat{W}_i L_B) - H_i\right]^H \left[\hat{F}_i(L_A + \hat{W}_i L_B) - H_i\right]$$

Equation XVI where:
- $(L_A^*, L_B^*)$ = vectors representing the optimal FFT's of sub-frames 30F and 30G, respectively, shown in FIG. 8;
- J=error cost function to be minimized;
- i=index identifying FFT blocks that are averaged (e.g., for image 908 in FIG. 12, four blocks are averaged, with i=1 corresponding to block 910A, i=2 corresponding to block 910B, i=3 corresponding to block 910C, and i=4 corresponding to block 910D);
- F=matrix representing the FFT of the interpolating filter, f;
- $L_A$=vector representing the FFT of sub-frame 30F shown in FIG. 8;
- $L_B$=vector representing the FFT of sub-frame 30G shown in FIG. 8;
- W=matrix representing the FFT of the complex coefficient given by Equation XV;
- H=vector representing the FFT of the desired high resolution image 28.

The superscript "H" in Equation XVI represents the Hermitian (i.e., $X^H$ is the Hermitian of X). The "hat" over the letters in Equation XVI indicates that those letters represent a diagonal matrix, as defined in the following Equation XVII:

$$\hat{X} = \operatorname{diag}(X) = \begin{pmatrix} X_1 & 0 & 0 & 0 \\ 0 & X_2 & 0 & 0 \\ 0 & 0 & X_3 & 0 \\ 0 & 0 & 0 & X_4 \end{pmatrix}$$

Equation XVII

Taking the derivative of Equation XVI with respect to the complex conjugate of $L_A$ and setting it equal to zero results in the following Equation XVIII:

$$\frac{\partial J}{\partial \overline{L}_A} = \underbrace{\sum_i \overline{\hat{F}}_i \hat{F}_i L_A}_{\overline{A}} + \underbrace{\sum_i \overline{\hat{F}}_i \hat{F}_i \hat{W}_i L_B}_{\hat{B}} - \underbrace{\sum_i \overline{\hat{F}}_i H_i}_{C} = 0$$

Equation XVIII

Taking the derivative of Equation XVI with respect to the complex conjugate of $L_B$ and setting it equal to zero results in the following Equation XIX:

$$\frac{\partial J}{\partial \overline{L}_B} = \underbrace{\sum_i \overline{\hat{W}}_i \overline{\hat{F}}_i \hat{F}_i L_A}_{\overline{\hat{B}}} + \underbrace{\sum_i \overline{\hat{F}}_i \hat{F}_i L_B}_{\hat{A}} - \underbrace{\sum_i \overline{\hat{W}}_i \overline{\hat{F}}_i H_i}_{D} = 0$$

Equation XIX

The horizontal bar over the letters in Equations XVIII and XIX indicates that those letters represent a complex conjugate (i.e., $\overline{A}$ represents the complex conjugate of A).

Solving Equations XVIII and XIX for $L_A$ and $L_B$ results in the following Equations XX and XXI $$L_B = \left(\overline{\hat{B}} \hat{A}^{-1} \hat{B}\right)^{-1} \left(D - \hat{A}^{-1} C\right)$$

Equation XX $$L_A = \hat{A}^{-1} \left(C - \hat{B} L_B\right)$$

Equation XXI

Equations XX and XXI may be implemented in the frequency domain using pseudo-inverse filtering. In one embodiment, sub-frame generation unit 36 is configured to generate sub-frames 30 based on Equations XX and XXI.

VIII. Adaptive Multi-Pass

An adaptive multi-pass algorithm for generating sub-frames 30 according to one embodiment uses past errors to update estimates for the sub-frame data, and provides fast convergence and low memory requirements. The adaptive multi-pass solution according to one embodiment is described in the context of the system 600 shown in FIG. 9. The system 600 shown in FIG. 9 can be represented mathematically in an error cost function by the following Equation XXII:

$$J^{(n)}(n) = |e^{(n)}(n)|^2 = \left(\sum_k l_Q^{(n)}(k) f(n-k) - h(n)\right)^2$$

Equation XXII where:
- n=index identifying the current iteration;
- $J^{(n)}(n)$=error cost function at iteration n;
- $e^{(n)}(n)$=square root of the error cost function, $J^{(n)}(n)$;
- n and k=indices for identifying high resolution pixel locations in images 604 and 610;
- $l_Q^{(n)}(k)$=image data from upsampled image 604 at location k;
- f(n-k)=filter coefficient of the interpolating filter at a position n-k; and
- h(n)=image data for desired high resolution image 28 at location n.

As can be seen from Equation XXII, rather than minimizing a global spatial domain error by summing over the entire high resolution image as shown in Equation IX above, a local spatial domain error, which is a function of n, is being minimized.

A least mean squares (LMS) algorithm is used in one embodiment to determine the update, which is represented in the following Equation XXIII:

$$l_Q^{(n+1)}(t) = l_Q^{(n)}(t) + \alpha \frac{\partial J^{(n)}(n)}{\partial l_Q^{(n)}(t)}, t \in \Theta$$

Equation XXIII where:
- $\Theta$=the set of quincunx lattice points (i.e., the dark pixels in upsampled image 604 in FIG. 9); and
- $\alpha$=sharpening factor.

Taking the derivative of Equation XXII provides the value for the derivative in Equation XXIII, which is given in the following Equation XXIV:

$$\frac{\partial J^{(n)}(n)}{\partial l_Q^{(n)}(t)} = 2\left(\sum_k l_Q^{(n)}(k)f(n-k) - h(n)\right)f(n-t) \quad \text{Equation XXIV}$$

In one embodiment, a block-LMS algorithm using the average gradient over a "region of influence" is used to perform the update, as represented by the following Equation XXV:

$$l_Q^{(n+1)}(t) = l_Q^{(n)}(t) + \alpha \sum_{n \in \Omega} \frac{\partial J^{(n)}(n)}{\partial l_Q^{(n)}(t)} \quad \text{Equation XXV}$$

where:
Ω=region of influence

Figure 14:
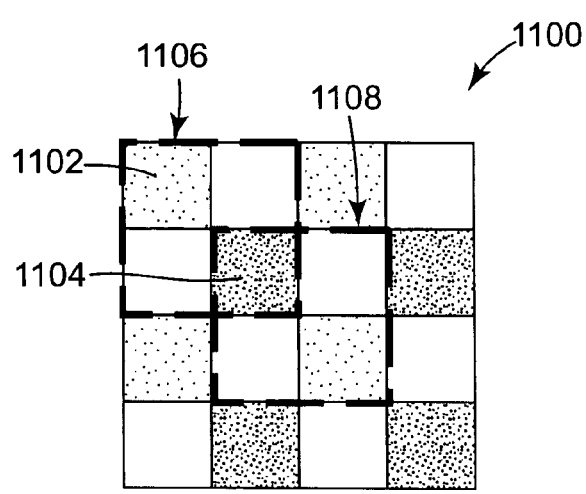
FIG. 14 is a diagram illustrating regions of influence for pixels in an upsampled image according to one embodiment of the present invention.

FIG. 14 is a diagram illustrating regions of influence (Ω) 1106 and 1108 for pixels in an upsampled image 1100 according to one embodiment of the present invention. Pixel 1102 of image 1100 corresponds to a pixel for a first sub-frame, and pixel 1104 of image 1100 corresponds to a pixel for a second sub-frame. Region 1106, which includes a 2×2 array of pixels with pixel 1102 in the upper left corner of the 2×2 array, is the region of influence for pixel 1102. Similarly, region 1108, which includes a 2×2 array of pixels with pixel 1104 in the upper left corner of the 2×2 array, is the region of influence for pixel 1104.

Figure 15:
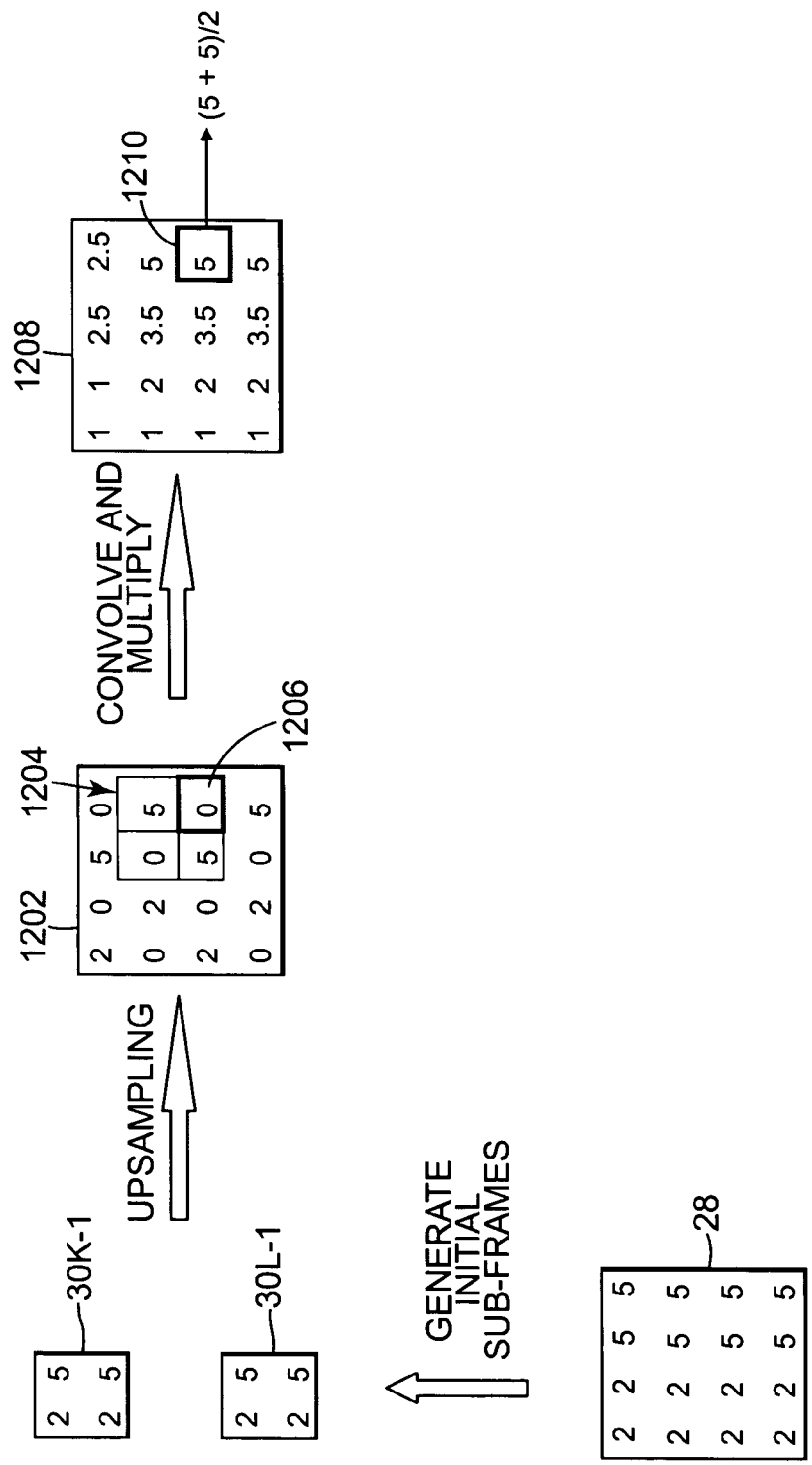
FIG. 15 is a diagram illustrating the generation of an initial simulated high resolution image based on an adaptive multi-pass algorithm according to one embodiment of the present invention.

FIG. 15 is a diagram illustrating the generation of an initial simulated high resolution image 1208 based on an adaptive multi-pass algorithm according to one embodiment of the present invention. An initial set of low resolution sub-frames 30K-1 and 30L-1 are generated based on an original high resolution image 28. In the illustrated embodiment, the initial set of sub-frames 30K-1 and 30L-1 are generated using an embodiment of the nearest neighbor algorithm described above with reference to FIG. 5. The sub-frames 30K-1 and 30L-1 are upsampled to generate upsampled image 1202. The upsampled image 1202 is convolved with an interpolating filter 1204, thereby generating a blocked image, which is then multiplied by a factor of 0.5 to generate simulated high resolution image 1208. In the illustrated embodiment, the interpolating filter 1204 is a 2×2 filter with filter coefficients of "1", and with the center of the convolution being the upper left position in the 2×2 matrix. The lower right pixel 1206 of the interpolating filter 1204 is positioned over each pixel in image 1202 to determine the blocked value for that pixel position. As shown in FIG. 15, the lower right pixel 1206 of the interpolating filter 1204 is positioned over the pixel in the third row and fourth column of image 1202, which has a value of "0". The blocked value for that pixel position is determined by multiplying the filter coefficients by the pixel values within the window of the filter 1204, and adding the results. Out-of-frame values are considered to be "0". For the illustrated embodiment, the blocked value for the pixel in the third row and fourth column of image 1202 is given by the following Equation XXVI (1×0)+(1×5)+(1×5)+(1×0)=10  Equation XXVI The value in Equation XXVI is then multiplied by the factor 0.5, and the result (i.e., 5) is the pixel value for the pixel 1210 in the third row and the fourth column of the initial simulated high resolution image 1208.

Figure 16:
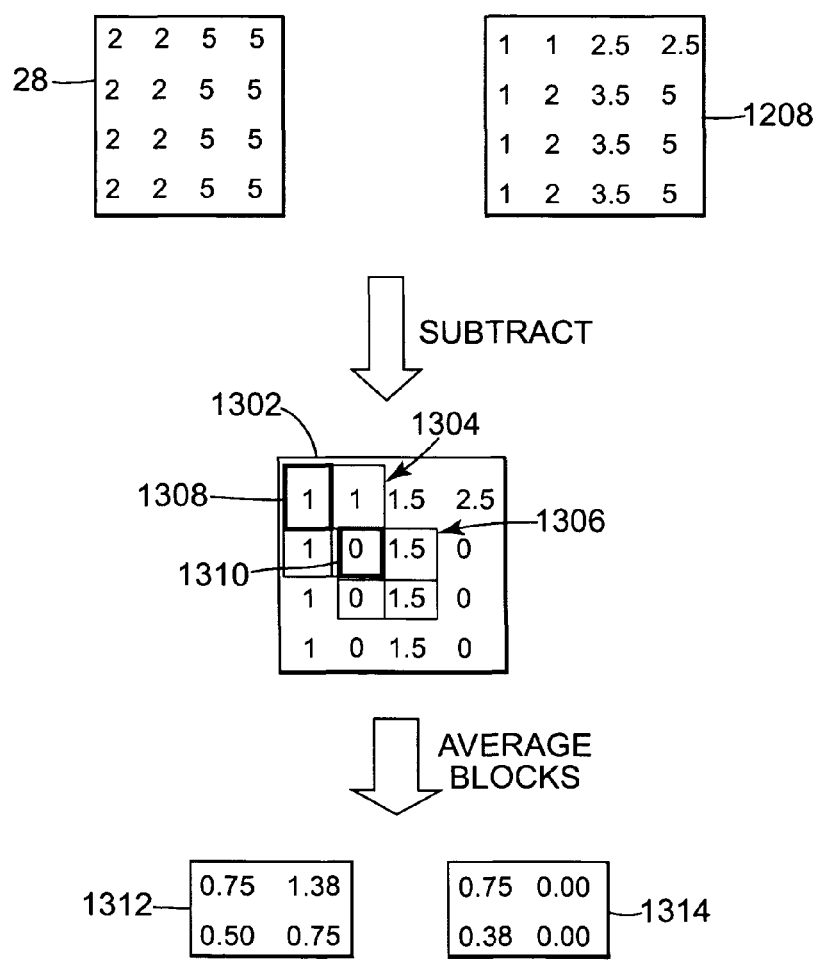
FIG. 16 is a diagram illustrating the generation of correction data based on an adaptive multi-pass algorithm according to one embodiment of the present invention.

After the initial simulated high resolution image 1208 is generated, correction data is generated. FIG. 16 is a diagram illustrating the generation of correction data based on the adaptive multi-pass algorithm according to one embodiment of the present invention. As shown in FIG. 16, the initial simulated high resolution image 1208 is subtracted from the original high resolution image 28 to generate an error image 1302. Correction sub-frames 1312 and 1314 are generated by averaging 2×2 blocks of pixels in error image 1302. For example, the pixel 1308 in the first column and first row of error image 1302 has a region of influence 1304. The pixel values within the region of influence 1304 are averaged to generate a first correction value (i.e., 0.75). The first correction value is used for the pixel in the first column and the first row of correction sub-frame 1312. Similarly, the pixel 1310 in the second column and second row of error image 1302 has a region of influence 1306. The pixel values within the region of influence 1306 are averaged to generate a second correction value (i.e., 0.75). The second correction value is used for the pixel in the first column and the first row of correction sub-frame 1314.

The correction value in the first row and second column of correction sub-frame 1312 (i.e., 1.38) is generated by essentially sliding the illustrated region of influence box 1304 two columns to the right and averaging those four pixels within the box 1304. The correction value in the second row and first column of correction sub-frame 1312 (i.e., 0.50) is generated by essentially sliding the illustrated region of influence box 1304 two rows down and averaging those four pixels within the box 1304. The correction value in the second row and second column of correction sub-frame 1312 (i.e., 0.75) is generated by essentially sliding the illustrated region of influence box 1304 two columns to the right and two rows down and averaging those four pixels within the box 1304.

The correction value in the first row and second column of correction sub-frame 1314 (i.e., 0.00) is generated by essentially sliding the illustrated region of influence box 1306 two columns to the right and averaging those pixels within the box 1306. Out-of-frame values are considered to be "0". The correction value in the second row and first column of correction sub-frame 1314 (i.e., 0.38) is generated by essentially sliding the illustrated region of influence box 1306 two rows down and averaging those pixels within the box 1306. The correction value in the second row and second column of correction sub-frame 1314 (i.e., 0.00) is generated by essentially sliding the illustrated region of influence box 1306 two columns to the right and two rows down and averaging those four pixels within the box 1306.

Figure 17:
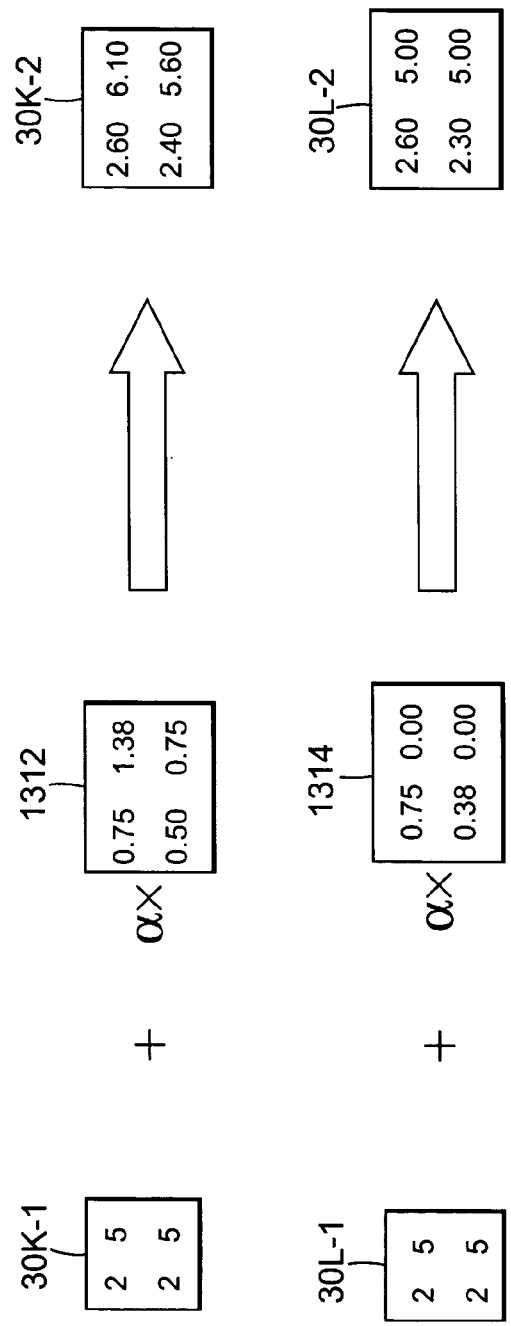
FIG. 17 is a diagram illustrating the generation of updated sub-frames based on an adaptive multi-pass algorithm according to one embodiment of the present invention.

The correction sub-frames 1312 and 1314 are used to generate updated sub-frames. FIG. 17 is a diagram illustrating the generation of updated sub-frames 30K-2 and 30L-2 based on the adaptive multi-pass algorithm according to one embodiment of the present invention. As shown in FIG. 17, the updated sub-frame 30K-2 is generated by multiplying the correction sub-frame 1312 by the sharpening factor, α, and adding the initial sub-frame 30K-1. The updated sub-frame 30L-2 is generated by multiplying the correction sub-frame 1314 by the sharpening factor, α, and adding the initial sub-frame 30L-1. In the illustrated embodiment, the sharpening factor, α, is equal to 0.8.

In one embodiment, updated sub-frames 30K-2 and 30L-2 are used in the next iteration of the adaptive multi-pass algorithm to generate further updated sub-frames. Any desired number of iterations may be performed. After a number of iterations, the values for the sub-frames generated using the adaptive multi-pass algorithm converge to optimal values. In one embodiment, sub-frame generation unit 36 is configured to generate sub-frames 30 based on the adaptive multi-pass algorithm.

The embodiment of the adaptive multi-pass algorithm described above with reference to FIGS. 15-17 is for two-position processing. For four-position processing, Equation XXIV becomes the following Equation XXVII:

$$\frac{\partial J^{(n)}(n)}{\partial l^{(n)}(t)} = 2\left(\sum_k l^{(n)}(k)f(n-k) - h(n)\right)f(n-t) \quad \text{Equation XXVII}$$

where:

$l^{(n)}$=low resolution data for the four sub-frames 30;

And Equation XXIII becomes the following Equation XXVIII:

$$l^{(n+1)}(t) = l^{(n)}(t) + \alpha \frac{\partial J^{(n)}(n)}{\partial l^{(n)}(t)} \quad \text{Equation XXVIII}$$

For four-position processing, there are four sub-frames, so the amount of low resolution data is the same as the amount of high resolution data. Each high resolution grid point contributes one error, and there is no need to average gradient update as represented in Equation XXV above. Rather, the error at a given location directly gives the update.

As described above, in one embodiment, the adaptive multi-pass algorithm uses a least mean squares (LMS) technique to generate correction data. In another embodiment, the adaptive multi-pass algorithm uses a projection on a convex set (POCS) technique to generate correction data. The adaptive multi-pass solution based on the POCS technique according to one embodiment is described in the context of the system 600 shown in FIG. 9. The system 600 shown in FIG. 9 can be represented mathematically in an error cost function by the following Equation XXIX:

$$|e(n)| = \left|\left(\sum_k l_Q(k)f(n-k) - h(n)\right)\right| \quad \text{Equation XXIX}$$

where:

e(n)=error cost function;

n and k=indices identifying high resolution pixel locations;

$l_Q(k)$=image data from upsampled image 604 at location k;

f(n-k)=filter coefficient of the interpolating filter at a position n-k; and h(n)=image data for desired high resolution image 28 at location n.

A constrained set for the POCS technique is defined by the following Equation XXX:

$$C(n) = \left\{ l_Q(n) : \left|\left(\sum_k l_Q(k)f(n-k) - h(n)\right)\right| \le \eta \right\} \quad \text{Equation XXX}$$

where:

C(n)=constrained set that includes all sub-frame data from upsampled image 604 that is bounded by parameter, $\eta$; and $\eta$=error magnitude bound constraint.

The sub-frame pixel values for the current iteration are determined based on the following Equation XXXI:

$$l_Q^{(n+1)}(t) = \begin{cases} (1-\lambda)l_Q^{(n)}(t) + \lambda\frac{e(n^*)-\eta}{\|f\|^2} & e(n^*) > \eta \ (t \in \Theta) \\ (1-\lambda)l_Q^{(n)}(t) + \lambda\frac{e(n^*)+\eta}{\|f\|^2} & e(n^*) < \eta \\ l_Q^{(n)}(t) & e(n^*) = \eta \end{cases} \quad \text{Equation XXXI}$$

where:

n=index identifying the current iteration;

$\lambda$=relaxation parameter; and $\|f\|$=norm of the coefficients of the interpolating filter.

The symbol, n*, in Equation XXXI represents the location in the region of influence, $\Omega$, where the error is a maximum, and is defined by the following Equation XXXII:

$$n^* = \text{argmax}\{n \in \Omega : |e(n)|\} \quad \text{Equation XXXII}$$

Figure 18:
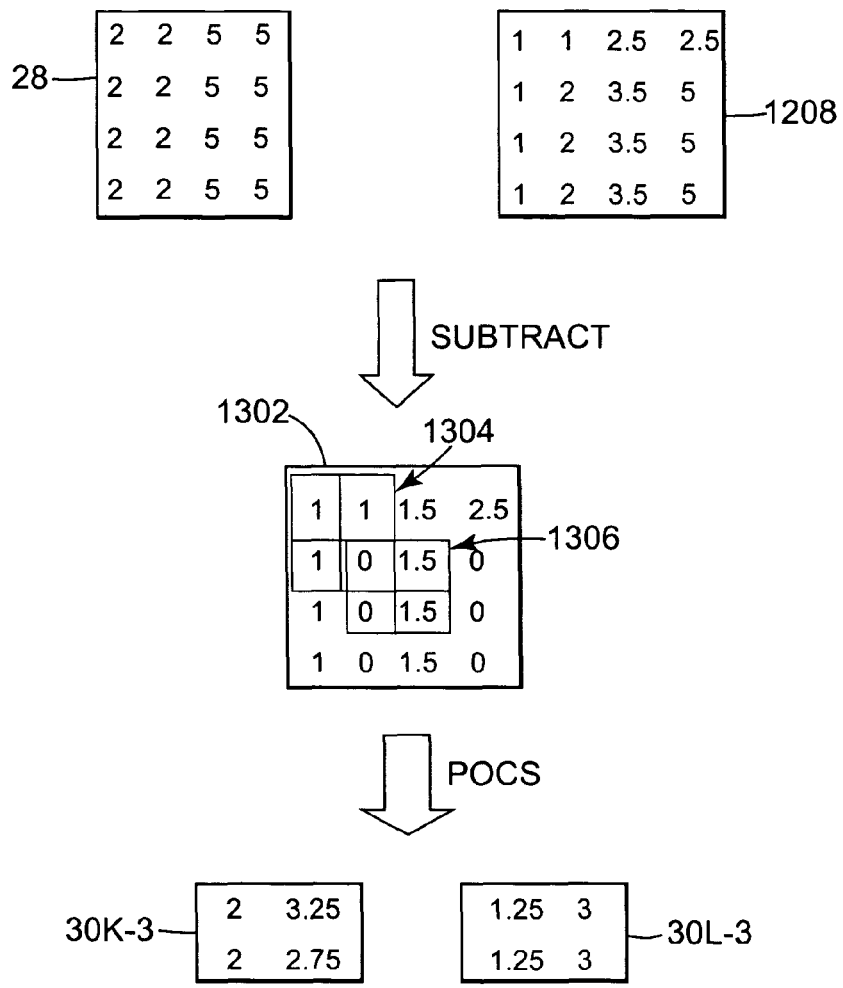
FIG. 18 is a diagram illustrating the generation of correction data based on an adaptive multi-pass algorithm according to another embodiment of the present invention.

FIG. 18 is a diagram illustrating the generation of correction data based on the adaptive multi-pass algorithm using a POCS technique according to one embodiment of the present invention. In one embodiment, an initial simulated high resolution image 1208 is generated in the same manner as described above with reference to FIG. 15, and the initial simulated high resolution image 1208 is subtracted from the original high resolution image 28 to generate an error image 1302. The Equation XXXI above is then used to generate updated sub-frames 30K-3 and 30L-3 from the data in error image 1302. For the illustrated embodiment, it is assumed that relaxation parameter, $\lambda$, in Equation XXXI is equal to 0.5, and the error magnitude bound constraint, $\eta$, is equal to 1.

With the POCS technique, rather than averaging the pixel values within the region of influence to determine a correction value as described above with reference to FIG. 16, the maximum error, e(n*), within the region of influence is identified. An updated pixel value is then generated using the appropriate formula from Equation XXXI, which will depend on whether the maximum error, e(n*), within the region of influence is greater than 1, less than 1, or equal to 1 (since $\eta$=1 for this example).

For example, the pixel in the first column and first row of error image 1302 has a region of influence 1304. The maximum error within this region of influence 1304 is 1 (i.e., e(n*)=1). Referring to Equation XXXI, for the case where e(n*)=1, the updated pixel value is equal to the previous value for this pixel. Referring to FIG. 15, the previous value for the pixel in the first column and the first row of sub-frame 30K-1 was 2, so this pixel remains with a value of 2 in updated sub-frame 30K-3. The pixel in the second column and second row of error image 1302 has a region of influence 1306. The maximum error within this region of influence 1306 is 1.5 (i.e., e(n*)=1.5). Referring to Equation XXXI, for the case where e(n*)>1, the updated pixel value is equal to half the previous value for this pixel, plus half of the quantity (e(n*)−1), which is equal to 1.25. Referring to FIG. 15, the previous value for the pixel in the first column and the first row of sub-frame 30L-1 was 2, so the updated value for this pixel is 1.25 in updated sub-frame 30L-3.

The region of influence boxes 1302 and 1304 are essentially moved around the error image 1302 in the same manner as described above with reference to FIG. 16 to generate the remaining updated values in updated sub-frames 30K-3 and 30L-3 based on Equation XXXI.

IX. Defective Pixel Correction Using Pixel and Sub-Pixel Offsets

In one embodiment, display device 26 comprises a plurality of display pixels arranged in a plurality of rows and a plurality of columns to form a pixel array. Each display pixel modulates light to display image sub-frames 30 for image frame 28 to reproduce displayed image 14. One or more of the display pixels of display device 26 may be defective. A defective pixel is defined as an aberrant or inoperative display pixel of display device 26 such as a display pixel that operates only in an "ON", i.e., stuck-on, or an "OFF", i.e., stuck-off, position, a display pixel that produces significantly more or less than an intended amount of intensity, and/or a display pixel that operates inconsistently, intermittently, or randomly.

To compensate for defective pixels in display device 26, image processing unit 24 selects a combination of pixel and sub-pixel offsets for displaying sub-frames 30 and adjusts sub-frame pixel values to compensate for the defective pixels for each image frame 28.

Figure 19A:
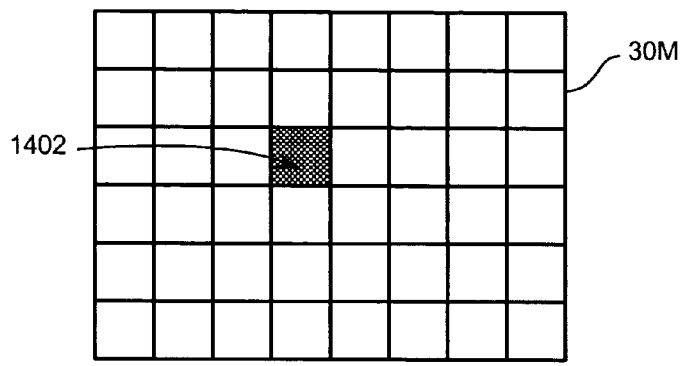
FIGS. 19A-C are schematic diagrams illustrating the display of sub-frames with pixel and sub-pixel offsets according to one embodiment of the present invention.

FIG. 19A is a schematic diagram illustrating the display of a sub-frame 30M by display device 26 where display device 26 includes a defective display pixel. With sub-frame 30M, the defective display pixel appears at a sub-frame pixel location 1402. As a result, sub-frame pixel location 1402 may appear fully illuminated or fully darkened in response to being displayed by display device 26 depending on whether the defective display pixel is stuck-on or stuck-off.

Figure 19B:
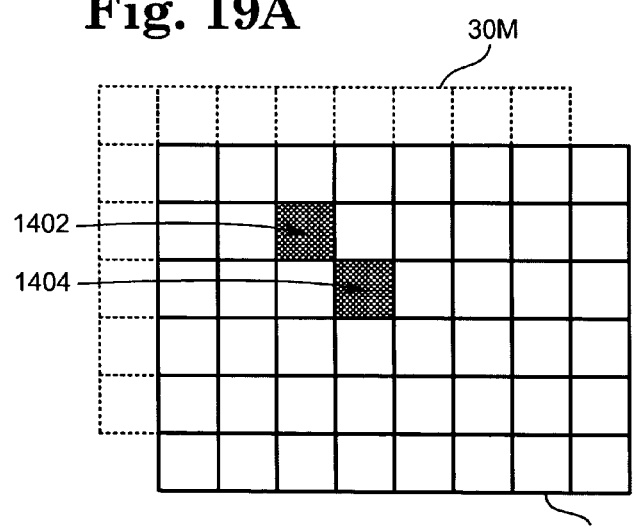

FIG. 19B is a schematic diagram illustrating the display of a sub-frame 30N relative to sub-frame 30M by display device 26 that includes the defective display pixel using a pixel offset. In FIG. 19B, sub-frame 30N is displayed with a diagonal pixel offset (i.e., one horizontal pixel and one vertical pixel) from sub-frame 30M. Accordingly, the defective display pixel appears at a sub-frame pixel location 1404 that is diagonally offset from sub-frame pixel location 1402 by one pixel.

In embodiments where display device 26 displays sub-frames 30 using pixel offsets (also referred to as integer offsets) as in the example of FIG. 19B, individual sub-frame pixels in each sub-frame align with corresponding sub-frame pixels in the other sub-frame. Accordingly, defective pixel correction may be applied by adjusting sub-frame pixel values displayed in a sub-frame pixel location associated with a defective display pixel of display device 26. For example, the sub-frame pixel value in sub-frame 30M that is displayed in the same location as sub-frame pixel location 1404 may be adjusted to compensate for the defective display pixel that appears during the display of sub-frame 30N. Similarly, the sub-frame pixel value in sub-frame 30N that is displayed in the same location as sub-frame pixel location 1402 may be adjusted to compensate for the defective display pixel that appears during the display of sub-frame 30M.

In embodiments that display other numbers of sub-frames per image frame 28, e.g., four sub-frames, sub-frame pixel values in multiple sub-frames may be adjusted to compensate for each defective display pixel. In other embodiments, defective pixel correction may be applied to sub-frames with other pixel offsets where the pixel offsets are defined by a first number of pixels in a first direction (e.g., horizontal) and a second number of pixels in a second direction (e.g., vertical). The first and second numbers are each integers greater than or equal to zero and may or may not be equal.

Figure 19C:
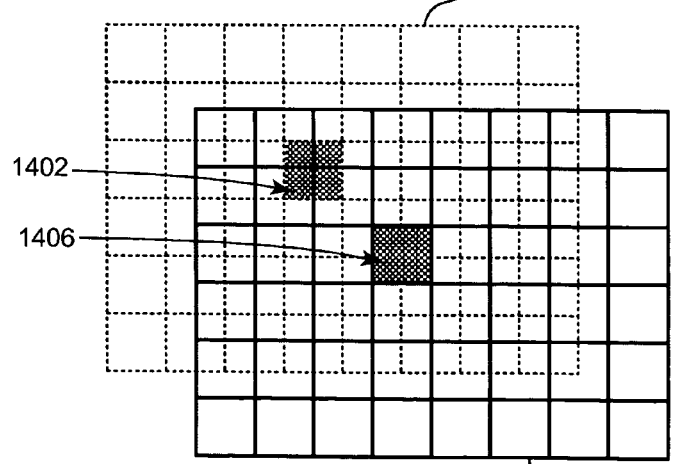

FIG. 19C is a schematic diagram illustrating the display of sub-frame 30N relative to sub-frame 30M by display device 26 that includes the defective display pixel using a sub-pixel offset. In FIG. 19C, sub-frame 30N is displayed with a diagonal sub-pixel offset (i.e., one and one-half horizontal pixels and one and one-half vertical pixels) from sub-frame 30M. Accordingly, the defective display pixel appears at a sub-frame pixel location 1406 that is diagonally offset from sub-frame pixel location 1402 by one and one-half pixels.

In embodiments where display device 26 displays sub-frames 30 using sub-pixel offsets as in the example of FIG. 19C, individual sub-frame pixels in each sub-frame overlap with four corresponding sub-frame pixels in the other sub-frame. Accordingly, defective pixel correction may be applied by adjusting the four sub-frame pixel values displayed in sub-frame pixel locations associated with a defective display pixel of display device 26. For example, the four sub-frame pixel values in sub-frame 30M that are displayed such that they partially overlap sub-frame pixel location 1404 may be adjusted to compensate for the defective display pixel that appears during the display of sub-frame 30N. Similarly, the four sub-frame pixel values in sub-frame 30N that are displayed such that they partially overlap as sub-frame pixel location 1402 may be adjusted to compensate for the defective display pixel that appears during the display of sub-frame 30M.

In embodiments that display other numbers of sub-frames per image frame 28, e.g., four sub-frames, multiple sub-frame pixel values in multiple sub-frames may be adjusted to compensate for each defective display pixel. In other embodiments, defective pixel correction may be applied to sub-frames with other sub-pixel offsets where the sub-pixel offsets are defined by a first number of pixels in a first direction (e.g., horizontal) and a second number of pixels in a second direction (e.g., vertical). The first and second numbers are each fractions of pixels (e.g., ½ of a pixel) that are greater than or equal to zero and may or may not be equal.

In applying defective pixel correction with pixel offsets, such as in FIG. 19B above, defective pixels may be partially or fully corrected but resolution may not be enhanced. In applying defective pixel correction with sub-pixel offsets, such as in FIG. 19C above, defective pixels may be partially corrected and resolution may be enhanced, but high contrast artifacts may be appear due to the display of the portion of the corrected sub-frame pixel values that do not overlap the defective pixel.

As will now be described, the use of both pixel offsets and sub-pixel offsets in the display of sub-frames associated with each image frame 28 may achieve a compromise between defect correction and resolution enhancement without introducing high contrast artifacts.

FIGS. 20A-20E are schematic diagrams illustrating the display of four sub-frames 30P, 30Q, 30R, and 30S for an image frame 28 with pixel and sub-pixel offsets. Sub-frames 30P, 30Q, 30R, and 30S each include a plurality of columns and a plurality of rows of individual pixels 18 with corresponding sub-frame pixel values. Each sub-frame pixel value of sub-frames 30P, 30Q, 30R, and 30S that is associated with a defective display pixel is adjusted to compensate for the defective pixel as will be described in additional detail below with reference to FIGS. 23 and 24.

As shown in FIGS. 20A-20E, sub-frame 30Q is offset from sub-frame 30P a horizontal pixel offset 1402 (e.g., one horizontal pixel), sub-frame 30R is offset from first sub-frame 30P by a vertical pixel offset 1404 (e.g., one vertical pixel), and sub-frame 30S is offset from first sub-frame 30P by a horizontal sub-pixel offset 1406 (e.g., one and one-half horizontal pixels) and a vertical sub-pixel offset 1408 (e.g., one and one-half vertical pixels).

As illustrated schematically in FIG. 20E, display device 26 alternates between displaying sub-frame 30P in a first position $P_1$, displaying sub-frame 30Q in a second position $P_2$ spatially offset from the first position, displaying sub-frame 30R in a third position $P_3$ spatially offset from the first position, and displaying sub-frame 30Q in a fourth position $P_4$ spatially offset from the first position.

In one embodiment, display device 26 performs one cycle of displaying sub-frame 30P in the first position, displaying sub-frame 30Q in the second position, displaying sub-frame 30R in the third position, and displaying sub-frame 30S in the fourth position for image frame 28. Thus, sub-frames 30Q, 30R, and 30S are spatially and temporally displayed relative to each other and relative to sub-frame 30P using pixel and sub-pixel offsets.

FIGS. 21A-21D illustrate one embodiment of completing one cycle of displaying a pixel 1481 from sub-frame 30P in the first position, displaying a pixel 1482 from sub-frame 30Q in the second position, displaying a pixel 1483 from sub-frame 30R in the third position, and displaying a pixel 1484 from sub-frame 30S in the fourth position. More specifically, FIG. 21A illustrates display of pixel 1481 from sub-frame 30P in the first position, FIG. 21B illustrates display of pixel 1482 from sub-frame 30Q in the second position (with the first position being illustrated by dashed lines), FIG. 21C illustrates display of pixel 1483 from sub-frame 30R in the third position (with the first position and the second position being illustrated by dashed lines), and FIG. 21D illustrates display of pixel 1484 from sub-frame 30S in the fourth position (with the first position, the second position, and the third position being illustrated by dashed lines).

With successive image frames 28, sub-frames 30 may be displayed with combinations of pixel and sub-pixel offsets other than those shown in the examples of FIGS. 20A-20E and 21A-21D.

FIG. 22 is a flow chart illustrating a method for generating and displaying sub-frames 30 with pixel and sub-pixel offsets. In FIG. 22, defect information is received by image processing unit 24 as indicated in a block 1500. The defect information identifies the display pixels in display device 26 that are defective. An image frame 28 is received by image processing unit 24 as indicated in a block 1502. Image processing unit 24 generates sub-frames 30 for image frame with both pixel and sub-pixel offsets using the defect information as indicated in a block 1504. In particular, image processing unit 24 adjusts sub-frame pixel values in each sub-frame 30 that are associated with a defective display pixel. Additional details of one embodiment of the function described in block 1504 are described below with reference to FIG. 23.

Display device 26 displays the sub-frames for image frame 28 using the pixel and sub-pixel offsets as indicated in a block 1506. A determination is made as to whether another image frame 28 is received as indicated in a block 1508. If another image frame 28 is received, then the functions of blocks 1504 and 1506 are repeated for the received image frame 28. The pixel and sub-pixel offsets used for this image frame 28 as well as succeeding image frames 28 may be the same or a different combination of pixel and sub-pixel offsets as those used for sub-frames associated with a previous image frame. If another image frame 28 is not received, then the method ends.

FIG. 23 is a flow chart illustrating a method for generating sub-frame pixel values associated with defective pixels during the process of generating each sub-frame. In FIG. 23, a determination is made as to whether sub-frame 30 is associated with a sub-pixel offset as indicated in a block 1552. If sub-frame 30 is not associated with a sub-pixel offset, then image processing unit calculates correction values for sub-frame pixel values associated with a defective pixel as indicated in a block 1554. Correction values are values intended to correct the defective display pixel as much as possible.

If sub-frame 30 is associated with a sub-pixel offset, then image processing unit calculates intermediate values for sub-frame pixel values associated with a defective pixel as indicated in a block 1554. Intermediate values are values between the correction values which attempt to fully correct defective display pixels and uncorrected values which do not attempt to correct the defective display pixels.

Figure 24:
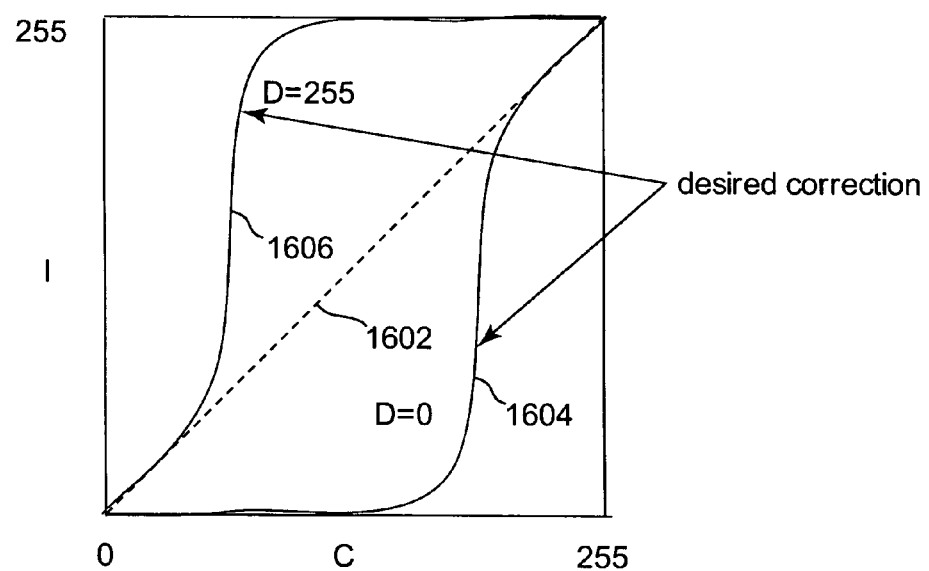
FIG. 24 is a graph illustrating an example of determining intermediate values according to one embodiment of the present invention.

FIG. 24 is a graph illustrating an example of determining intermediate values for sub-frames 30 associated with sub-pixel offsets. In FIG. 24, the uncorrected value of image 12(C) is represented along the x-axis with values from 0 to 255, and the intermediate value (I) is represented along the y-axis with values from 0 to 255. A value of 0 represents a fully darkened pixel, and a value of 255 represents a fully illuminated pixel. Dashed line 1602 represents the sub-frame pixel values of sub-frame 30 where no correction has been applied. Curve 1604 represents the intermediate values to be used for each desired value of image 12 for defective pixel values that are stuck-off (D=0), i.e., fully darkened. Curve 1606 represents the intermediate values to be used for each desired value of image 12 for defective pixel values that are stuck-on (D=255), i.e., fully illuminated.

In other embodiments, other ways of determining intermediate values for sub-frames 30 associated with sub-pixel offsets may be used.

In one embodiment, an adaptive multi-pass algorithm is used to generate sub-frames 30. In this embodiment, the initial sub-frame pixel values of sub-frames 30 for each iteration of the algorithm may be adjusted according to the defective display pixels of display device 26 prior to generating a simulated image. In particular, sub-frame pixel values associated with pixel offsets are adjusted using correction values, and sub-frame pixel values associated with sub-pixel offsets are adjusted using intermediate values. As a result, the adjusted sub-frame pixel values are used in generating the simulated image, error information, and updated sub-frames 30.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image with a display device having at least one defective display pixel, the method comprising:

generating first, second, and third sub-frames using image data for the image, information that identifies the at least one defective display pixel, a first pixel offset between the first sub-frame and the second sub-frame, and a sub-pixel offset between the first sub-frame and the third sub-frame; and alternating between displaying the first sub-frame in a first position, displaying the second sub-frame in a second position spatially offset from the first position by the first pixel offset, and displaying the third sub-frame in a third position spatially offset from the first position by the sub-pixel offset.

2. The method of claim 1 further comprising:

generating a fourth sub-frame using image data for the image, information that identifies the at least one defective display pixel and a second pixel offset between the first sub-frame and the fourth sub-frame; and wherein alternating between displaying the first, second, and third sub-frames further includes alternating between displaying the first sub-frame in the first position, displaying the second sub-frame in the second position by the first pixel offset, displaying the third sub-frame in the third position spatially offset from the first position by the sub-pixel offset, and displaying the fourth sub-frame in a fourth position spatially offset from the first position by the second pixel offset.

3. The method of claim 1 wherein generating the first, the second, and the third sub-frames includes adjusting sub-frame pixel values associated with the at least one defective display pixel.

4. The method of claim 1 wherein generating the first and the second sub-frames includes calculating a correction value for each sub-frame pixel value associated with the at least one defective display pixel.

5. The method of claim 4 wherein generating the third sub-frame includes calculating a plurality of intermediate values for each sub-frame pixel value associated with the at least one defective display pixel.

6. The method of claim 5 wherein the plurality of intermediate values are associated with a stuck-on pixel.

7. The method of claim 5 wherein the plurality of intermediate values are associated with a stuck-off pixel.

8. The method of claim 1 further comprising:
generating the first, the second, and the third sub-frames using an adaptive multi-pass algorithm.

9. A system for displaying an image, the system comprising:
a display device having a defective display pixel; and
an image processing unit configured to generate first, second, and third sub-frames using image data for the image, information that identifies the defective display pixel, a first pixel offset between the first sub-frame and the second sub-frame, and a sub-pixel offset between the first sub-frame and the third sub-frame;
wherein the display device is adapted to alternately display the first sub-frame in a first position, display the second sub-frame in a second position spatially offset from the first position by the first pixel offset, and display the third sub-frame in a third position spatially offset from the first position by the sub-pixel offset.

10. The system of claim 9 wherein the image processing unit is configured to generate a fourth sub-frame using image data for the image, information that identifies the defective display pixel and a second pixel offset between the first sub-frame and the fourth sub-frame, and wherein the display device is adapted to alternately display the first sub-frame in the first position, display the second sub-frame in the second position by the first pixel offset, display the third sub-frame in the third position spatially offset from the first position by the sub-pixel offset, and display the fourth sub-frame in a fourth position spatially offset from the first position by the second pixel offset.

11. The system of claim 9 wherein the image processing unit is configured to adjust sub-frame pixel values associated with the defective display pixel.

12. The system of claim 9 wherein the image processing unit is configured to calculate a correction value for each sub-frame pixel value associated with the defective display pixel.

13. The system of claim 12 wherein the image processing unit is configured to calculate a plurality of intermediate values for each sub-frame pixel value associated with the defective display pixel.

14. The system of claim 13 wherein the plurality of intermediate values are associated with a stuck-on pixel.

15. The system of claim 13 wherein the plurality of intermediate values are associated with a stuck-off pixel.

16. The system of claim 9 wherein the image processing unit is configured to generate the first, the second, and the third sub-frames using an adaptive multi-pass algorithm.

17. A system for displaying an image using a display device having a defective display pixel, the system comprising:
means for generating first, second, and third sub-frames using image data for the image, information that identifies the defective display pixel, a first pixel offset between the first sub-frame and the second sub-frame, and a sub-pixel offset between the first sub-frame and the third sub-frame; and
means for alternating between displaying the first sub-frame in a first position, displaying the second sub-frame in a second position spatially offset from the first position by the first pixel offset, and displaying the third sub-frame in a third position spatially offset from the first position by the sub-pixel offset.

18. The system of claim 17 further comprising:
means for generating a fourth sub-frame using image data for the image, information that identifies the defective display pixel and a second pixel offset between the first sub-frame and the fourth sub-frame; and
means for alternating between displaying the first sub-frame in the first position, displaying the second sub-frame in the second position by the first pixel offset, displaying the third sub-frame in the third position spatially offset from the first position by the sub-pixel offset, and displaying the fourth sub-frame in a fourth position spatially offset from the first position by the second pixel offset.

19. The system of claim 17 further comprising:
means for adjusting sub-frame pixel values in the first, the second, and the third sub-frames associated with the defective display pixel.

20. The system of claim 17 further comprising:
means for calculating a correction value for each sub-frame pixel value in the first and the second sub-frames associated with the defective display pixel.

21. The system of claim 20 further comprising:
means for calculating a plurality of intermediate values for each sub-frame pixel value in the third sub-frame associated with the defective display pixel.

22. The system of claim 21 wherein the plurality of intermediate values are associated with a stuck-on pixel.

23. The system of claim 21 wherein the plurality of intermediate values are associated with a stuck-off pixel.

24. A non-transitory computer-readable medium storing computer-executable instructions that, when executed by a computer, perform a method of generating a first sub-frame, a second sub-frame associated with a pixel offset from the first sub-frame, and a third sub-frame associated with a sub-pixel offset from the first sub-frame for display at spatially offset positions by a display device having a defective display pixel to generate the appearance of an image, comprising:
calculating a first sub-frame pixel value associated with the defective display pixel for the first sub-frame;
calculating a second sub-frame pixel value associated with the defective display pixel for the second sub-frame based on the pixel offset from the first sub-frame; and calculating at least third and fourth sub-frame pixel values associated with the defective display pixel for the third sub-frame based on the sub-pixel offset from the first sub-frame.

25. The non-transitory computer-readable medium of claim 24 storing computer-executable instructions for performing the method further comprising:

calculating the first sub-frame pixel value associated with the defective display pixel for the first sub-frame to be a first correction value; and calculating the second sub-frame pixel value associated with the defective display pixel for the second sub-frame to be a second correction value.

26. The non-transitory computer-readable medium of claim 24 storing computer-executable instructions for performing the method further comprising:

calculating the at least third and fourth sub-frame pixel values associated with the defective display pixel for the third sub-frame to be first and second intermediate values, respectively.

* * * * *